US008122212B2

(12) United States Patent
Otani et al.

(10) Patent No.: US 8,122,212 B2
(45) Date of Patent: Feb. 21, 2012

(54) METHOD AND APPARATUS FOR LOGICAL VOLUME MANAGEMENT FOR VIRTUAL MACHINE ENVIRONMENT

(75) Inventors: Toshio Otani, Sunnyvale, CA (US); Naoko Ichikawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 386 days.

(21) Appl. No.: 12/418,765

(22) Filed: Apr. 6, 2009

(65) Prior Publication Data
US 2010/0257326 A1    Oct. 7, 2010

(51) Int. Cl.
*G06F 12/16* (2006.01)
(52) U.S. Cl. ......... 711/162; 711/112; 711/114; 711/206
(58) Field of Classification Search .................. 711/162, 711/112, 114, 206, E12.058, E12.103
See application file for complete search history.

(56) References Cited

U.S. PATENT DOCUMENTS

| 7,900,005 | B2 * | 3/2011 | Kotsovinos et al. .......... 711/162 |
| 2007/0111361 | A1 | 5/2007 | Park | |

OTHER PUBLICATIONS

VMWARE, Inc., "VMware Virtual Machine File System: Technical Overview and Best Practices", A VMware Technical White Paper, Paper Number: WP-022-PRD-01-01, 2007.
VMWARE, Inc., "Using Raw Device Mapping".
Microsoft Corporation, "Virtual Hard Disk Image Format Specification", http://technet.microsoft.com/en-us/virtualserver/bb676673(printer).aspx, Oct. 10, 2005.

* cited by examiner

*Primary Examiner* — David Lam
(74) *Attorney, Agent, or Firm* — Mattingly & Malur, P.C.

(57) ABSTRACT

Logical volume management for storage subsystem in virtual machine environment is disclosed. In one embodiment, a storage system comprises a storage subsystem including a processor, a memory, one or more virtual disks, and one or more logical disks each corresponding to a physical storage area in the storage subsystem; and a host computer connected with the storage subsystem via a network, the host computer including virtual machines running thereon, the virtual machines each being connected to at least one of the virtual disks or logical disks in the storage subsystem. In the storage subsystem, abstract disks each represent one of the virtual disks or logical disks. An abstract disk management table is stored in the memory of the storage subsystem to manage a relationship between the abstract disks and the one or more virtual disks and between the abstract disks and the one or more logical disks.

20 Claims, 30 Drawing Sheets

Example of Virtual Consistency Group Management Using Abstract Disk

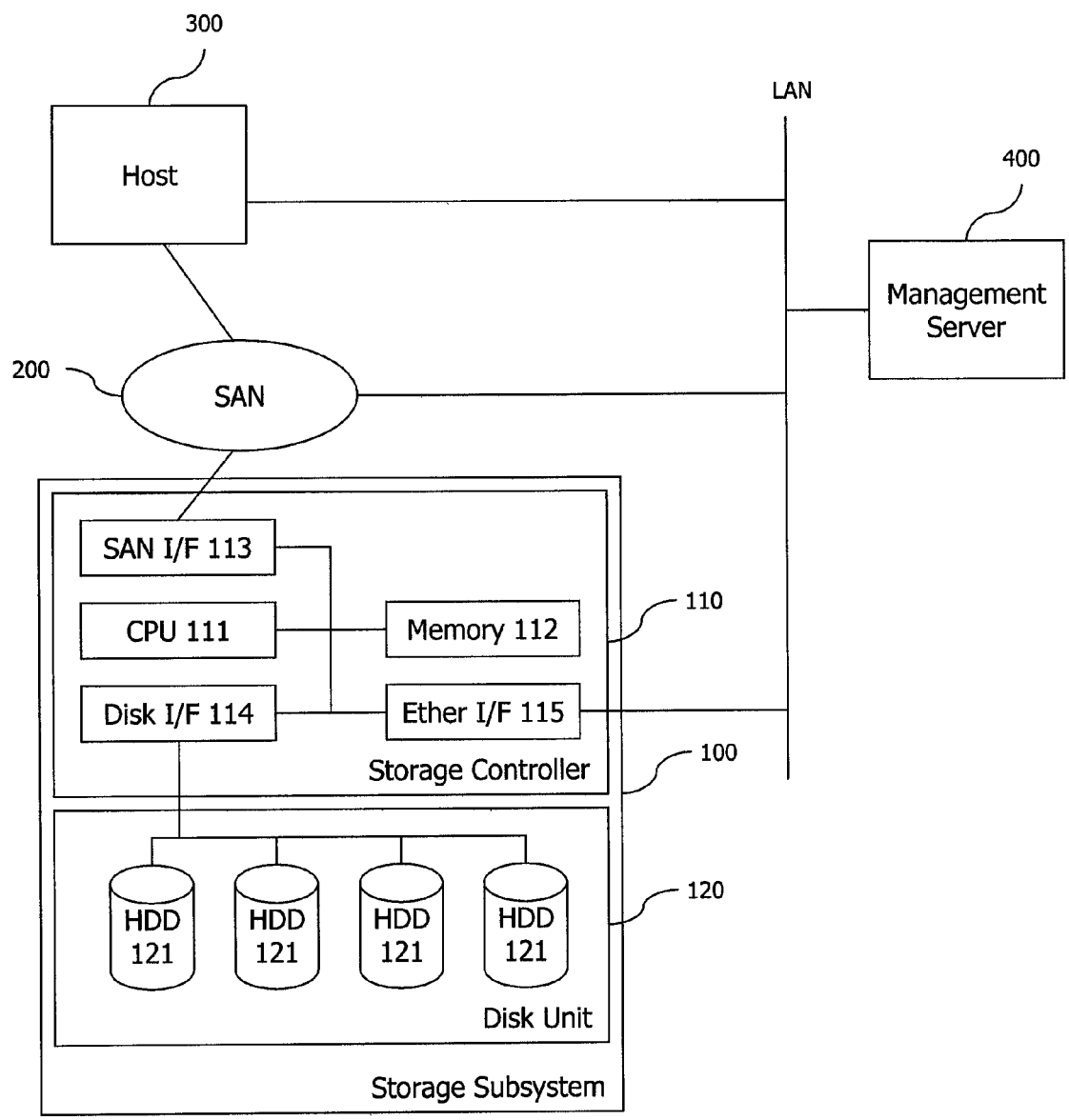
Fig.1 System Configuration

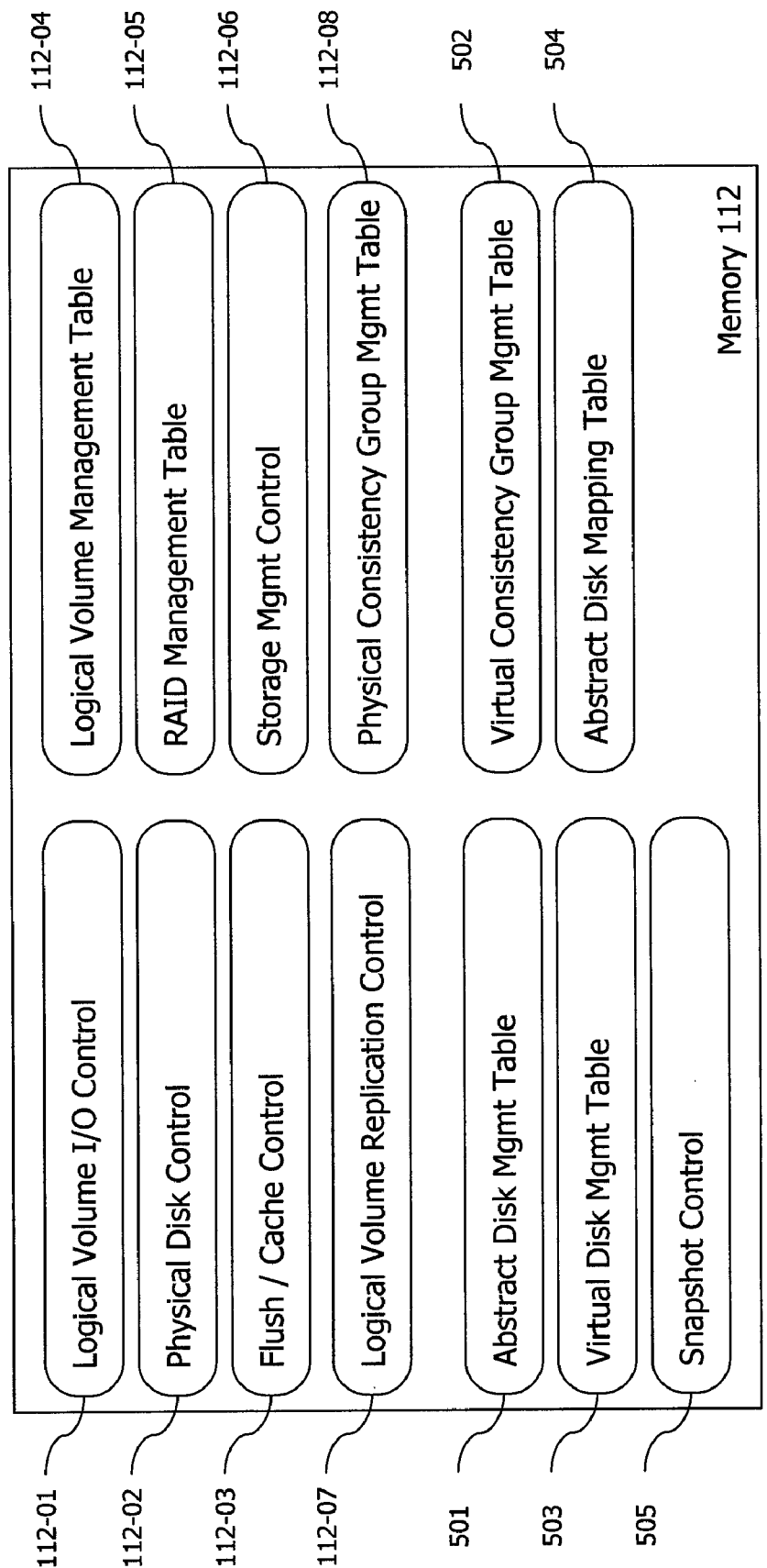
Fig.2 Software Module Configuration on Storage Controller

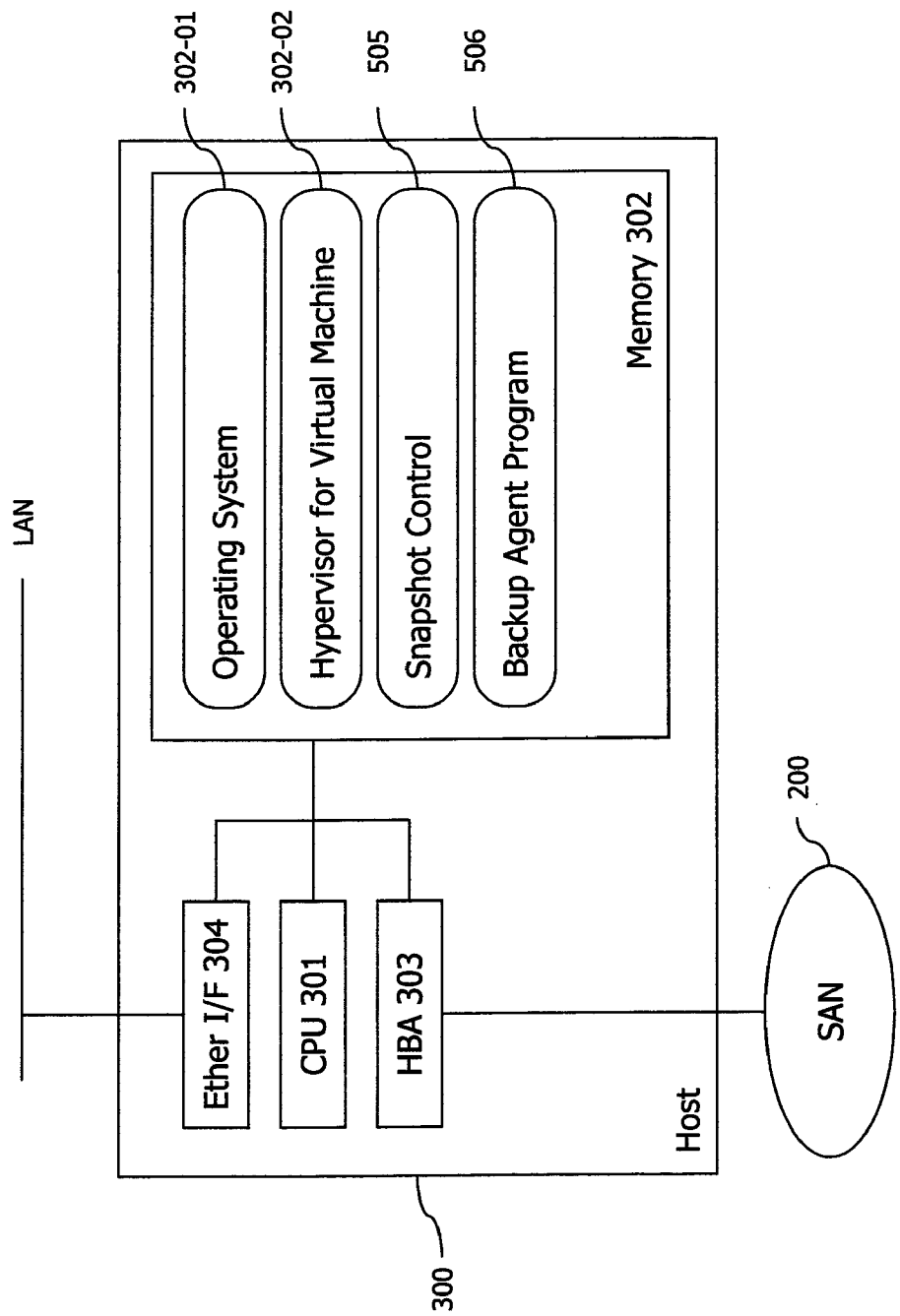
Fig.3 Configuration of Host

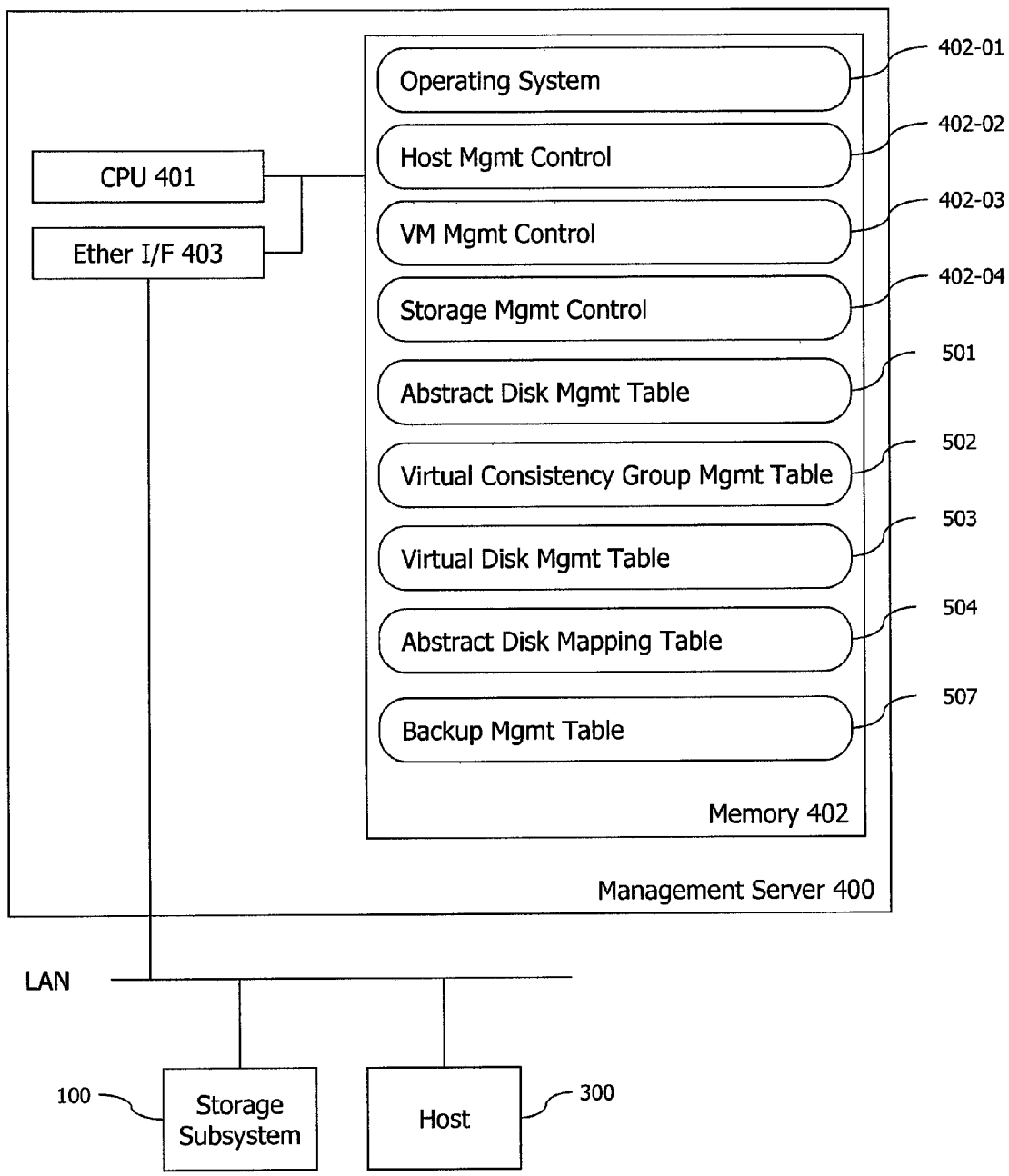
Fig.4 Configuration of Management Server

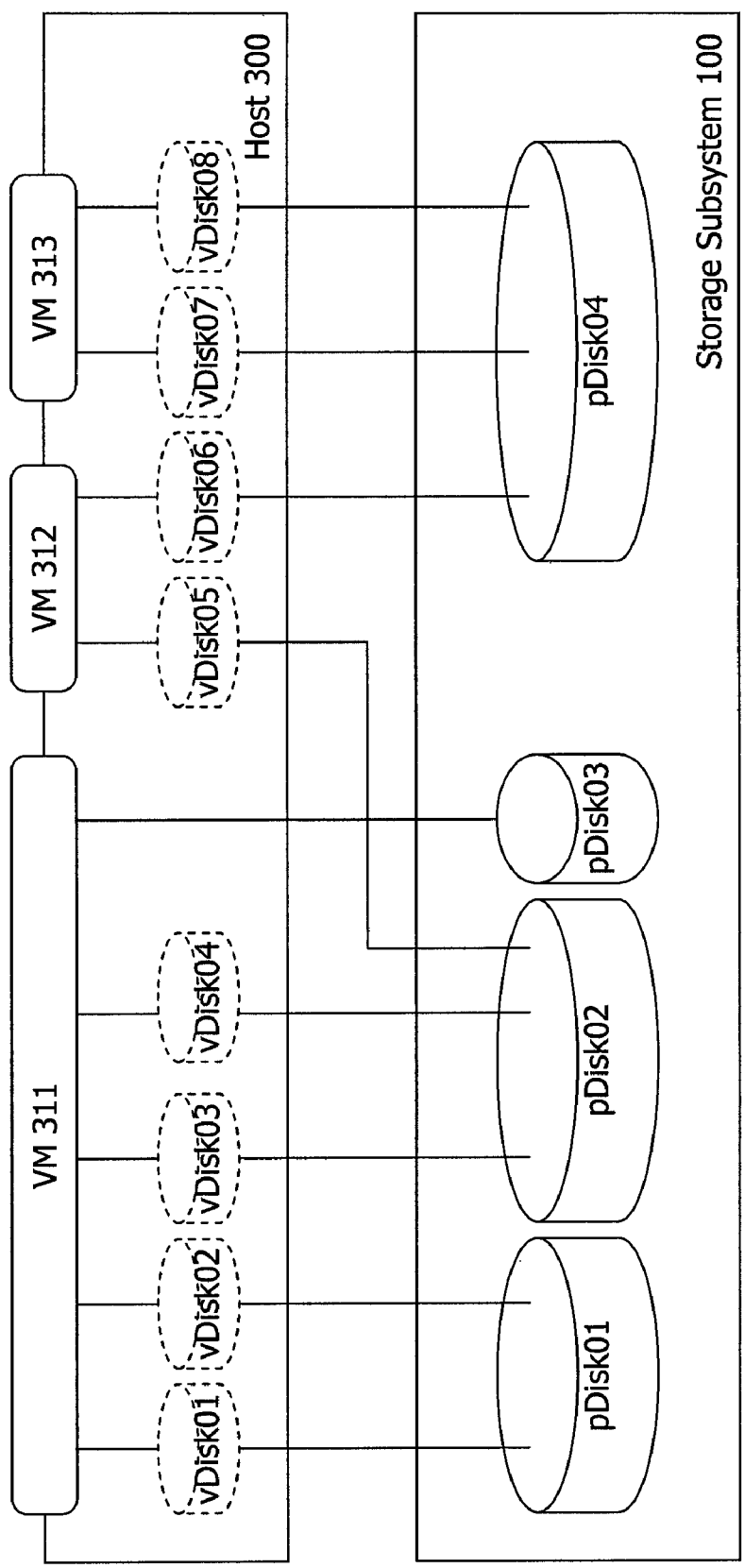
Fig.5 System Configuration (logical view)

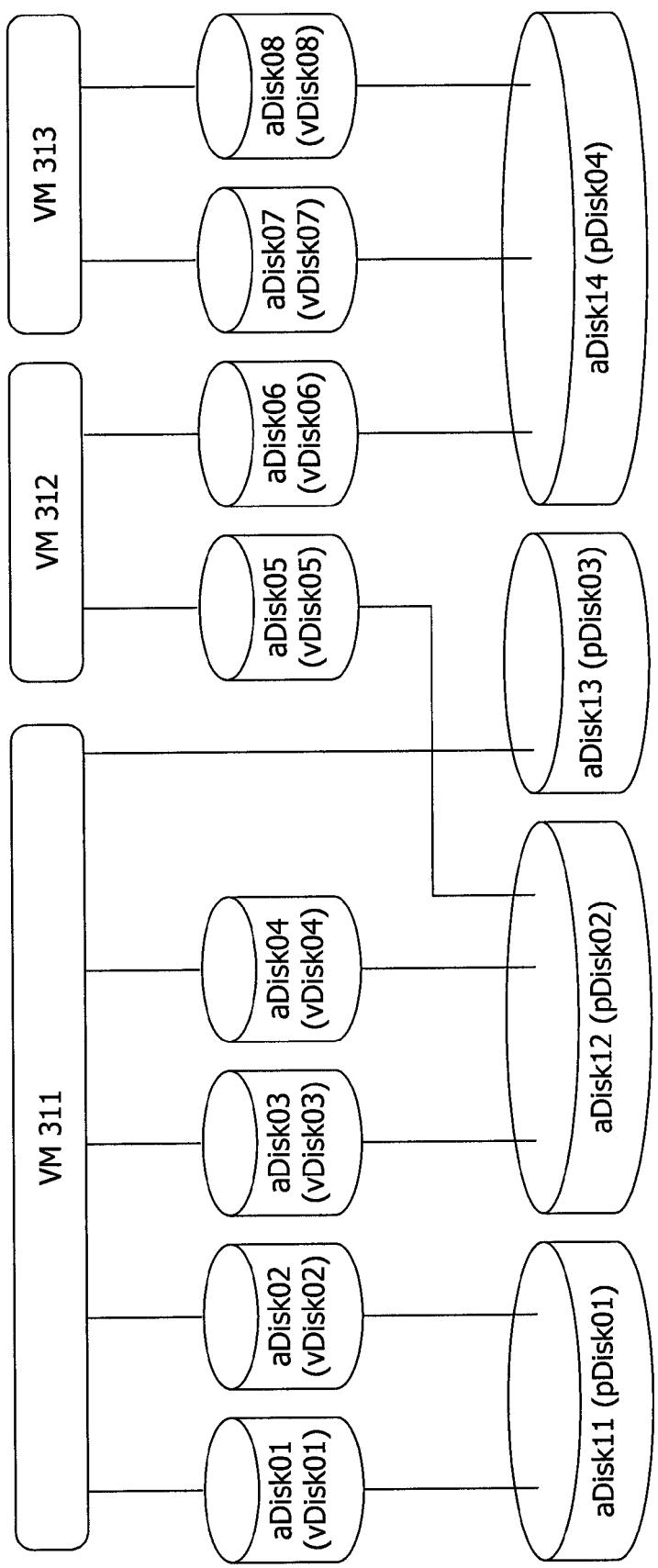
Fig.6 Example of Volume Management Using Abstract Disk

| aDisk | Disk |
|---|---|
| aDisk01 | vDisk01 |
| aDisk02 | vDisk02 |
| aDisk03 | vDisk03 |
| aDisk04 | vDisk04 |
| aDisk05 | vDisk05 |
| aDisk06 | vDisk06 |
| aDisk07 | vDisk07 |
| aDisk08 | vDisk08 |
| aDisk11 | pDisk01 |
| aDisk12 | pDisk02 |
| aDisk13 | pDisk03 |
| aDisk14 | pDisk04 |

Abstract Disk Mgmt Table 501

Fig.7 Example of Abstract Disk Mgmt Table

| Machine | aDisk |
|---|---|
| VM 311 | aDisk01 |
| VM 311 | aDisk02 |
| VM 311 | aDisk03 |
| VM 311 | aDisk04 |
| VM 311 | aDisk13 |
| VM 312 | aDisk05 |
| VM 312 | aDisk06 |
| VM 313 | aDisk07 |
| VM 313 | aDisk08 |
| Host300 | aDisk11 |
| Host300 | aDisk12 |
| Host300 | aDisk14 |

Abstract Disk Mapping Table 504

Fig.8 Example of Abstract Disk Mapping Table

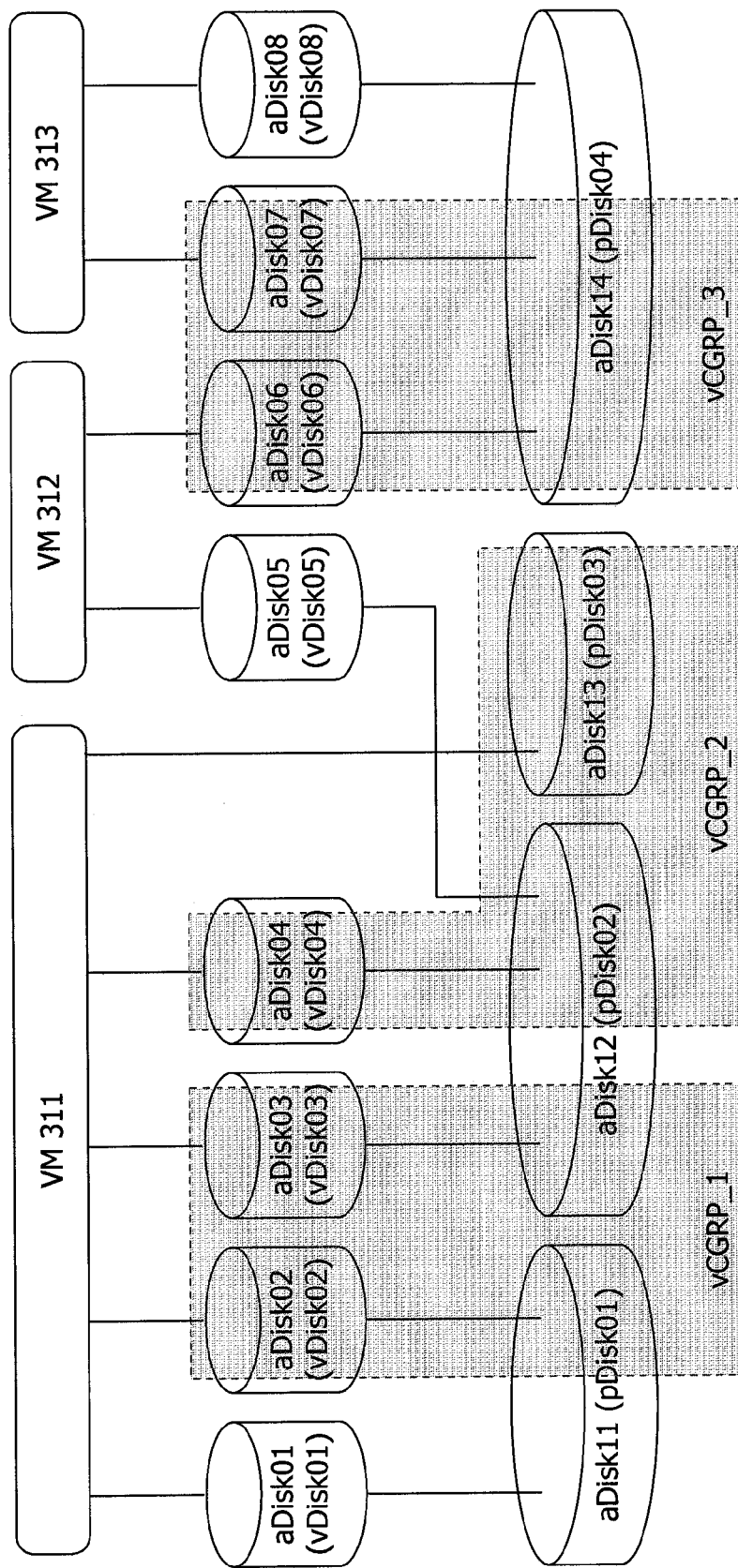
Fig.9 Example of Virtual Consistency Group Management Using Abstract Disk

| vCGRP | aDisk |
|---|---|
| 1 | aDisk02 |
| | aDisk03 |
| 2 | aDisk04 |
| | aDisk13 |
| 3 | aDisk06 |
| | aDisk07 |

Virtual Consistency Group Mgmt Table 502

Fig.10 Example of Virtual Consistency Group Mgmt Table

| vDisk | pDisk |
|---|---|
| vDisk01 | pDisk01 |
| vDisk02 | pDisk01 |
| vDisk03 | pDisk02 |
| vDisk04 | pDisk02 |
| vDisk05 | pDisk02 |
| vDisk06 | pDisk04 |
| vDisk07 | pDisk04 |
| vDisk08 | pDisk04 |

Virtual Disk Mgmt Table 503

Fig.11 Example of Virtual Disk Mgmt Table

| pCGRP | pDisk |
|---|---|
| 1 | pDisk01 |
|  | pDisk02 |
| 2 | pDisk02 |
|  | pDisk03 |
| 3 | pDisk04 |

Physical Consistency Group Mgmt Table 112-08

Fig.12 Example of Physical Consistency Group Mgmt Table

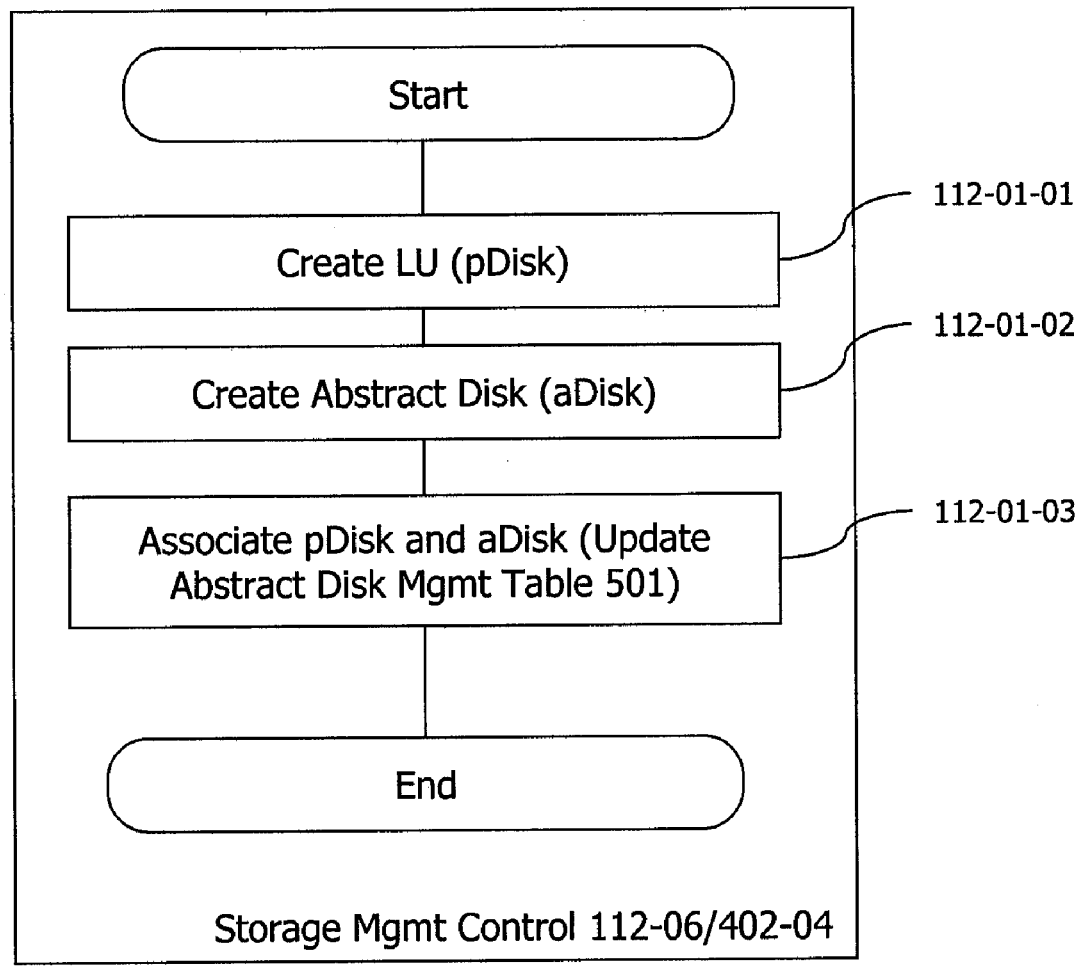
Fig.13 Flowchart of Abstract Disk creation (pDisk)

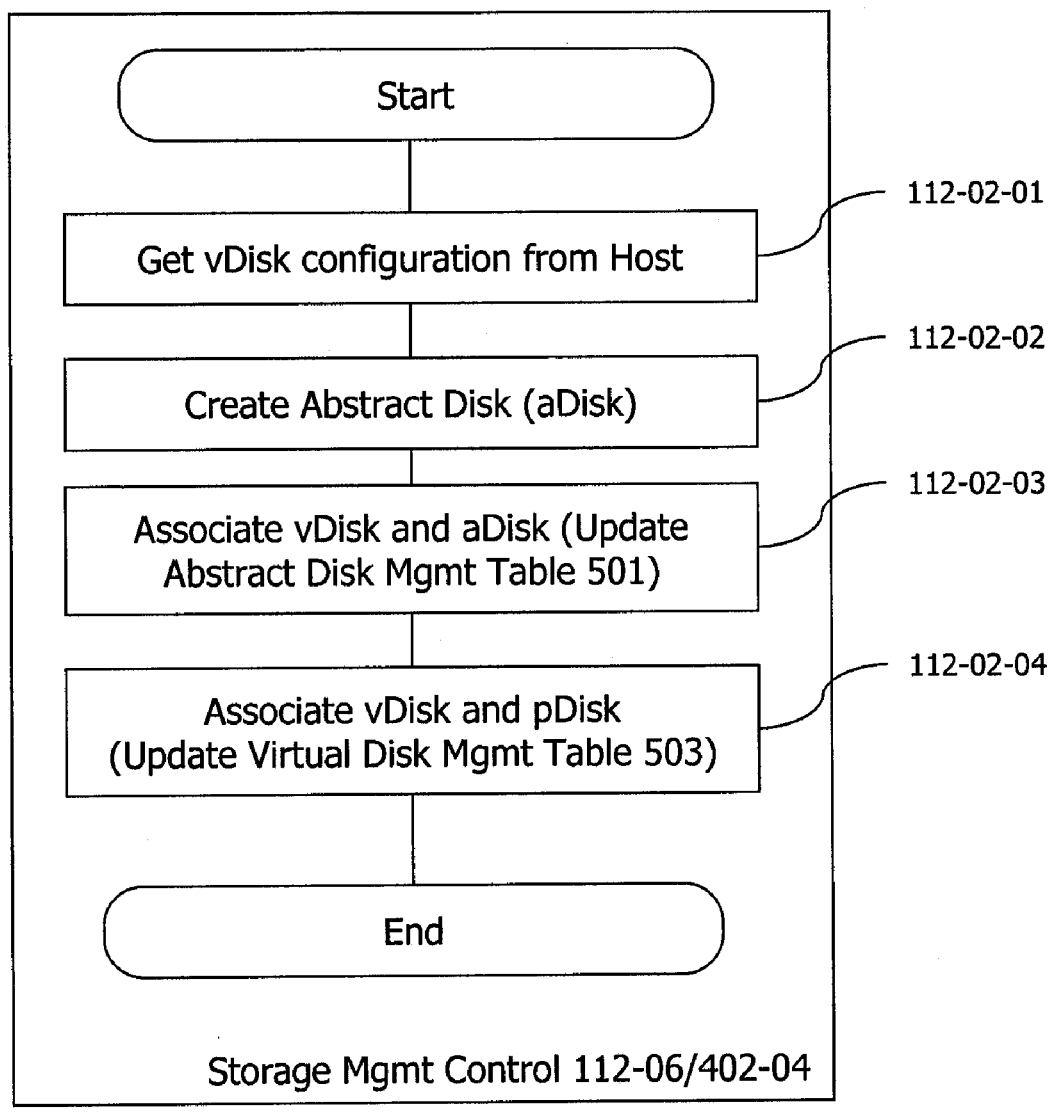
Fig.14 Flowchart of Abstract Disk creation (vDisk)

Fig.15 Example of Management View

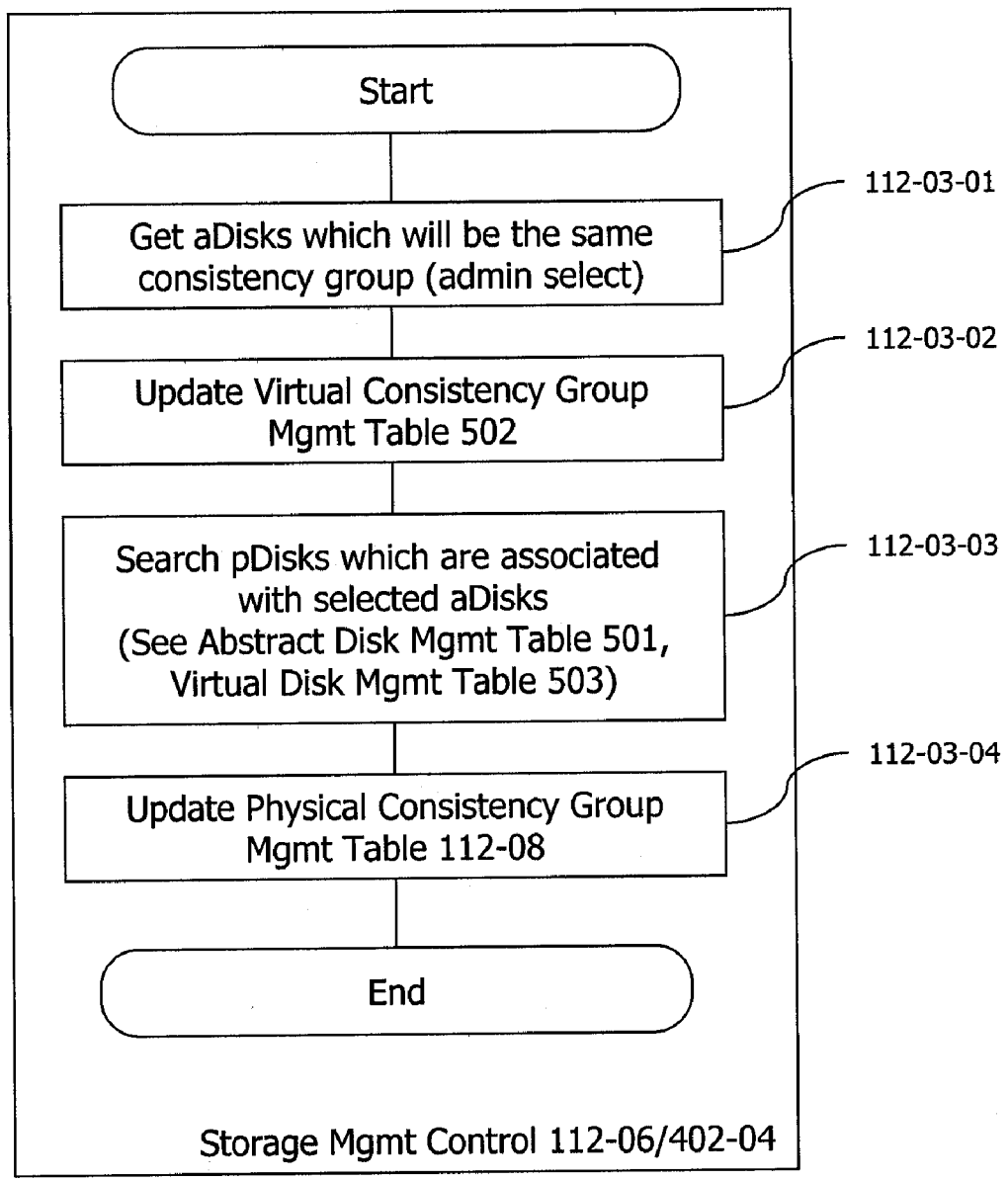
Fig.16 Flowchart of Virtual Consistency Group Creation

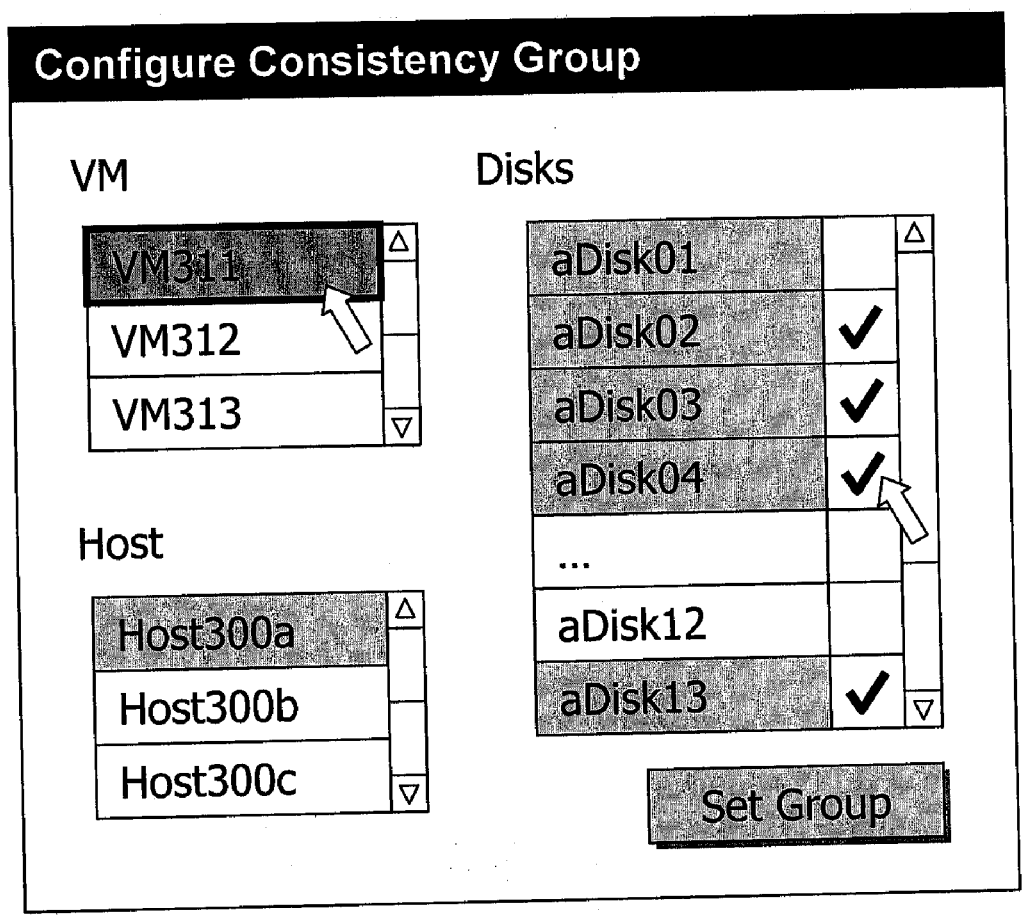
Fig.17 Example of Management View

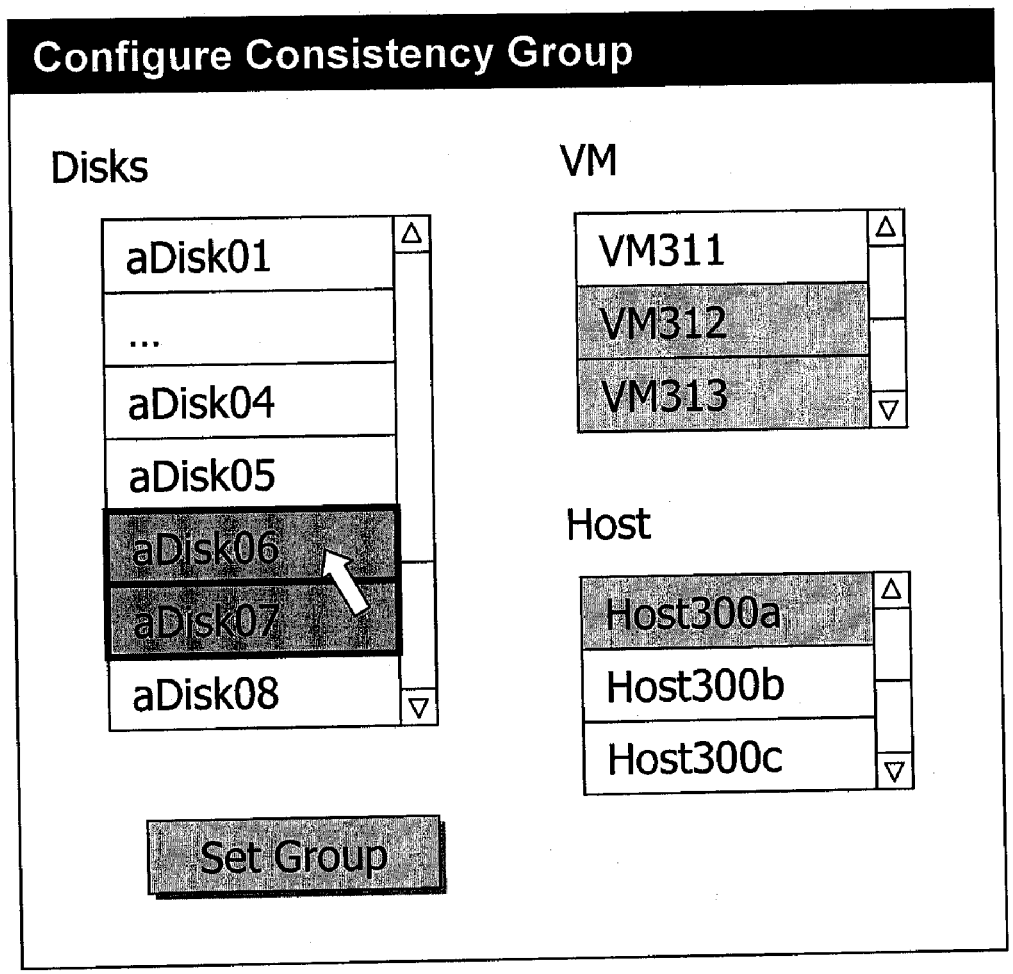
Fig.18 Example of Management View

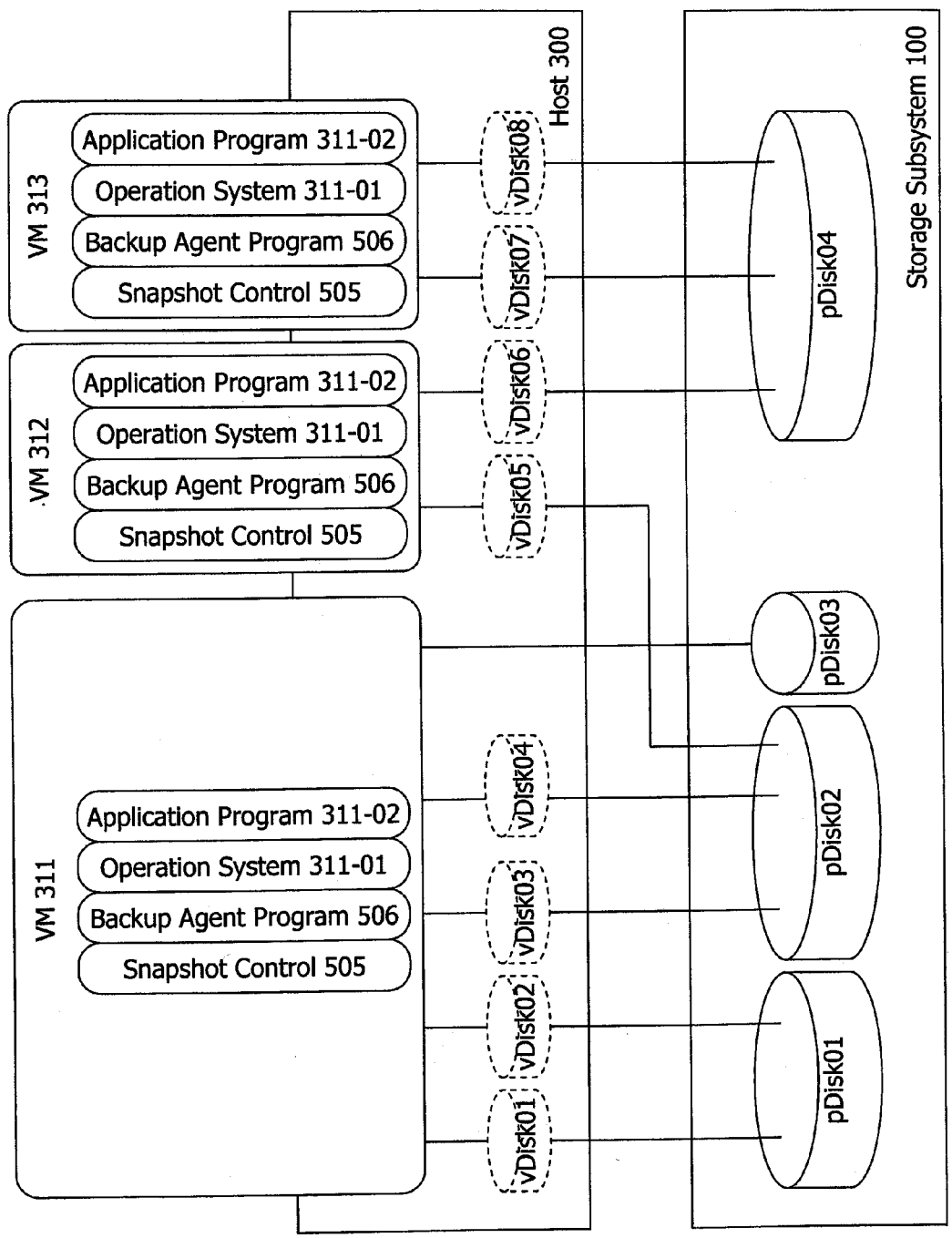
Fig.19 System Configuration for Backup (logical view)

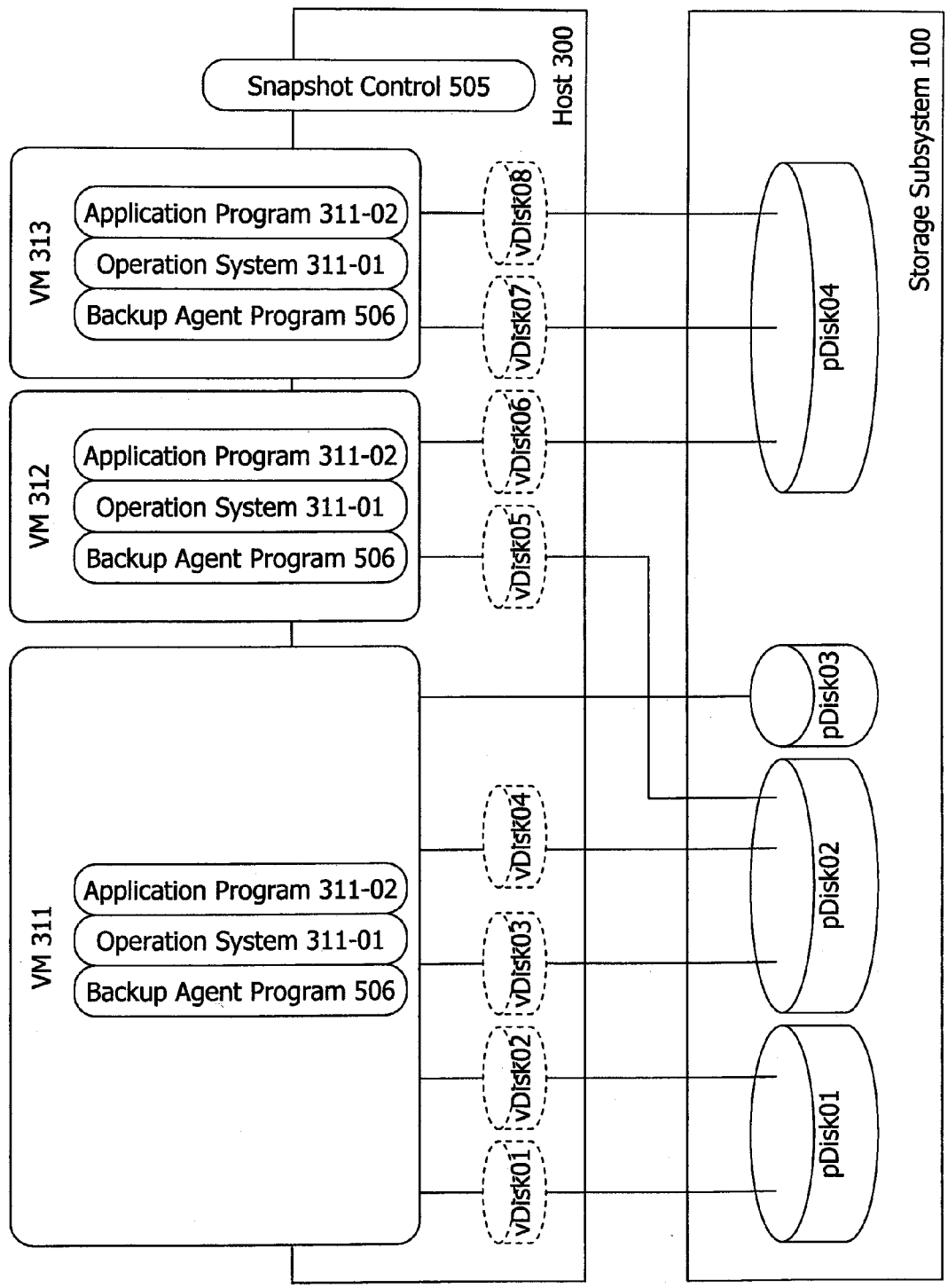
Fig.20 System Configuration for Backup (logical view)

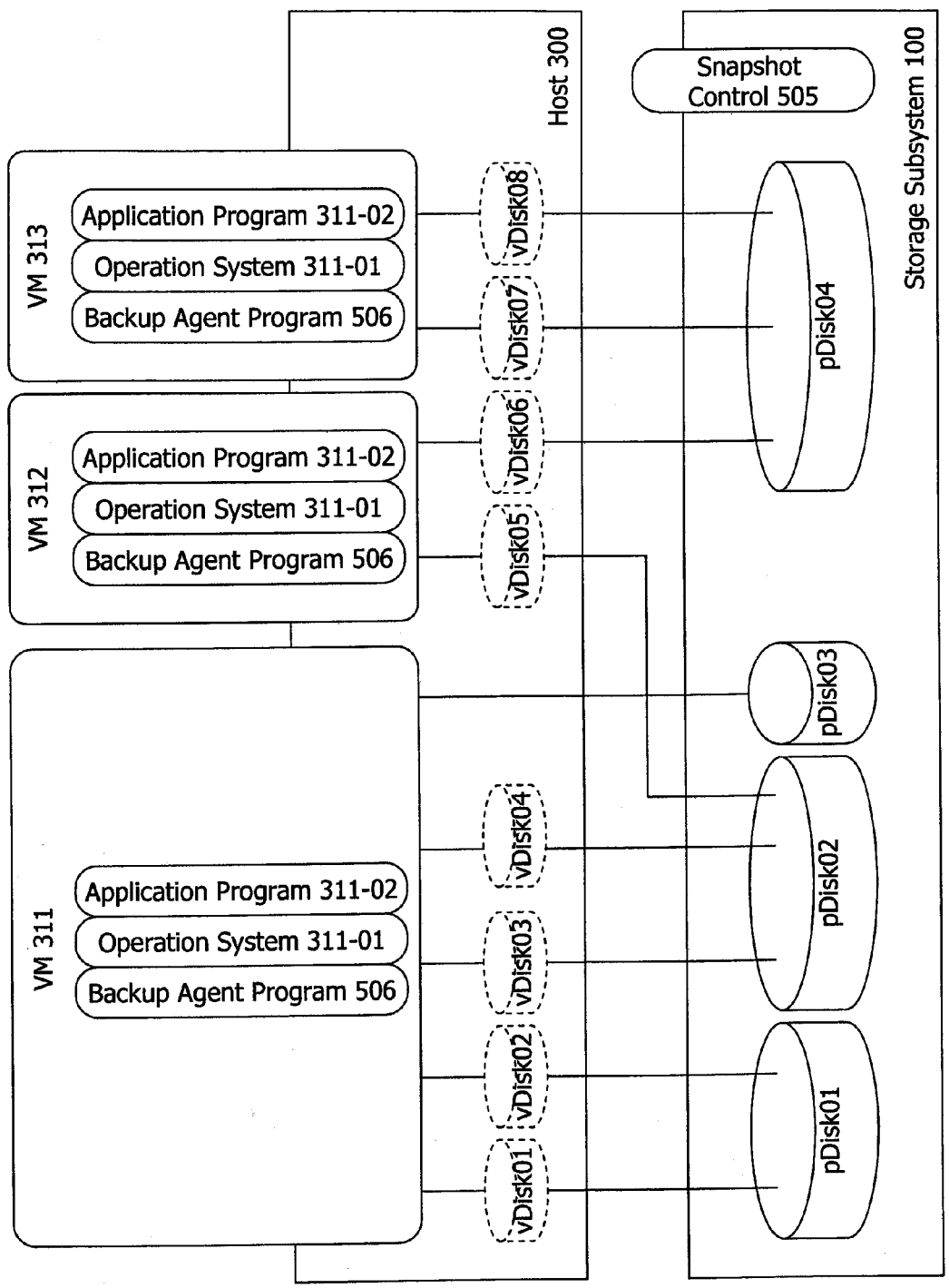

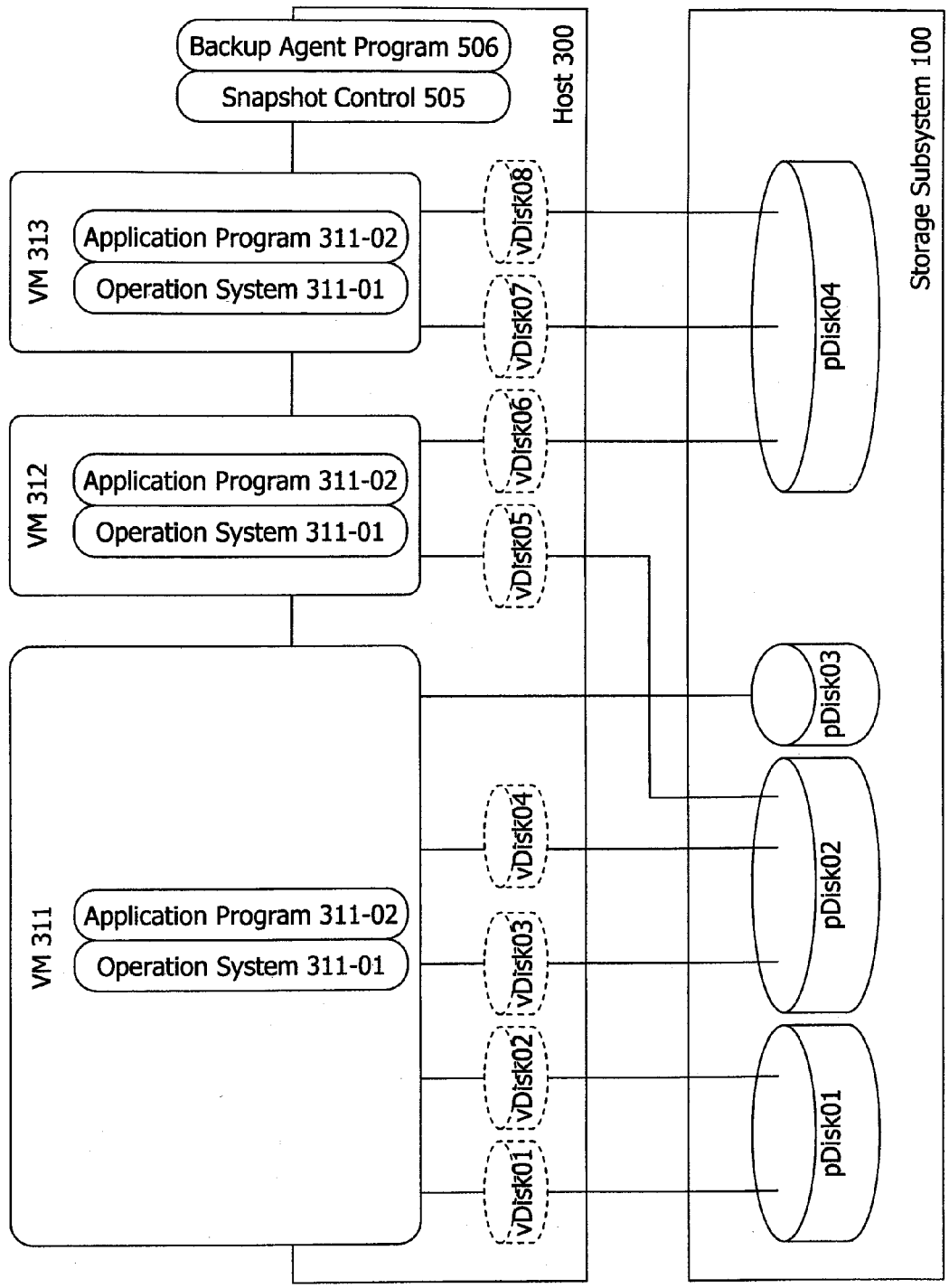
Fig.22 System Configuration for Backup (logical view)

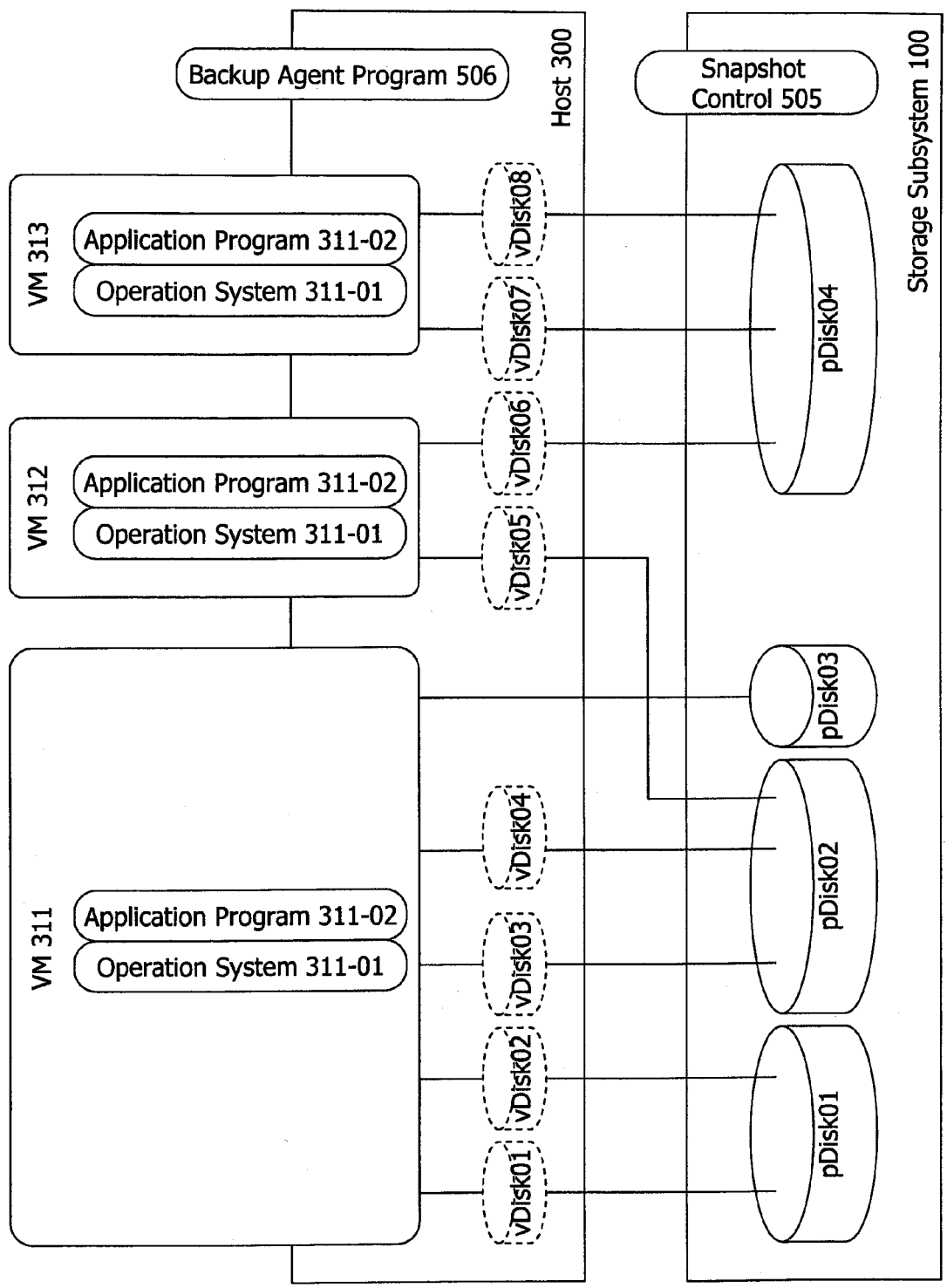
Fig.23 System Configuration for Backup (logical view)

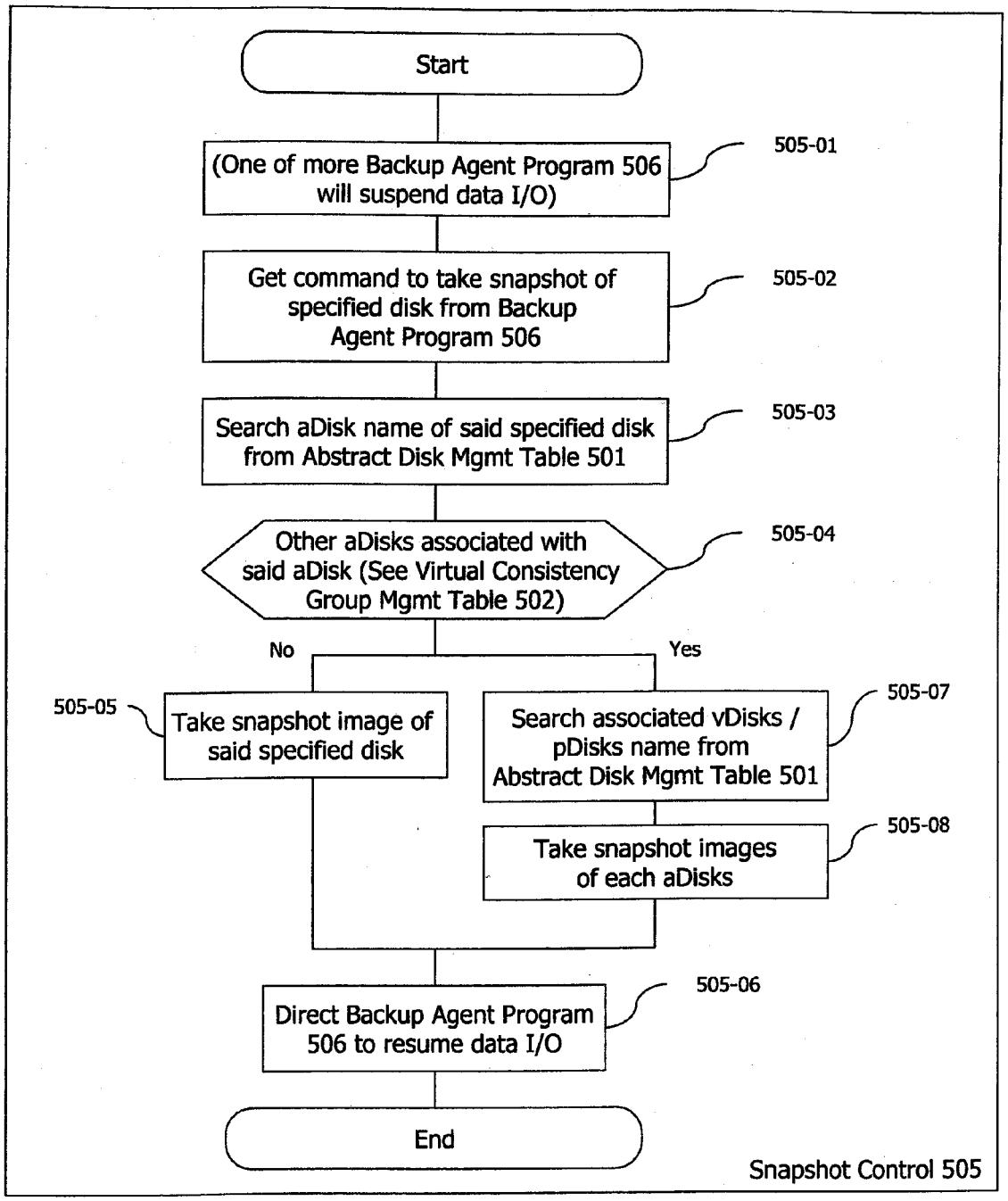
Fig.24 Flowchart of Taking Snapshot Image

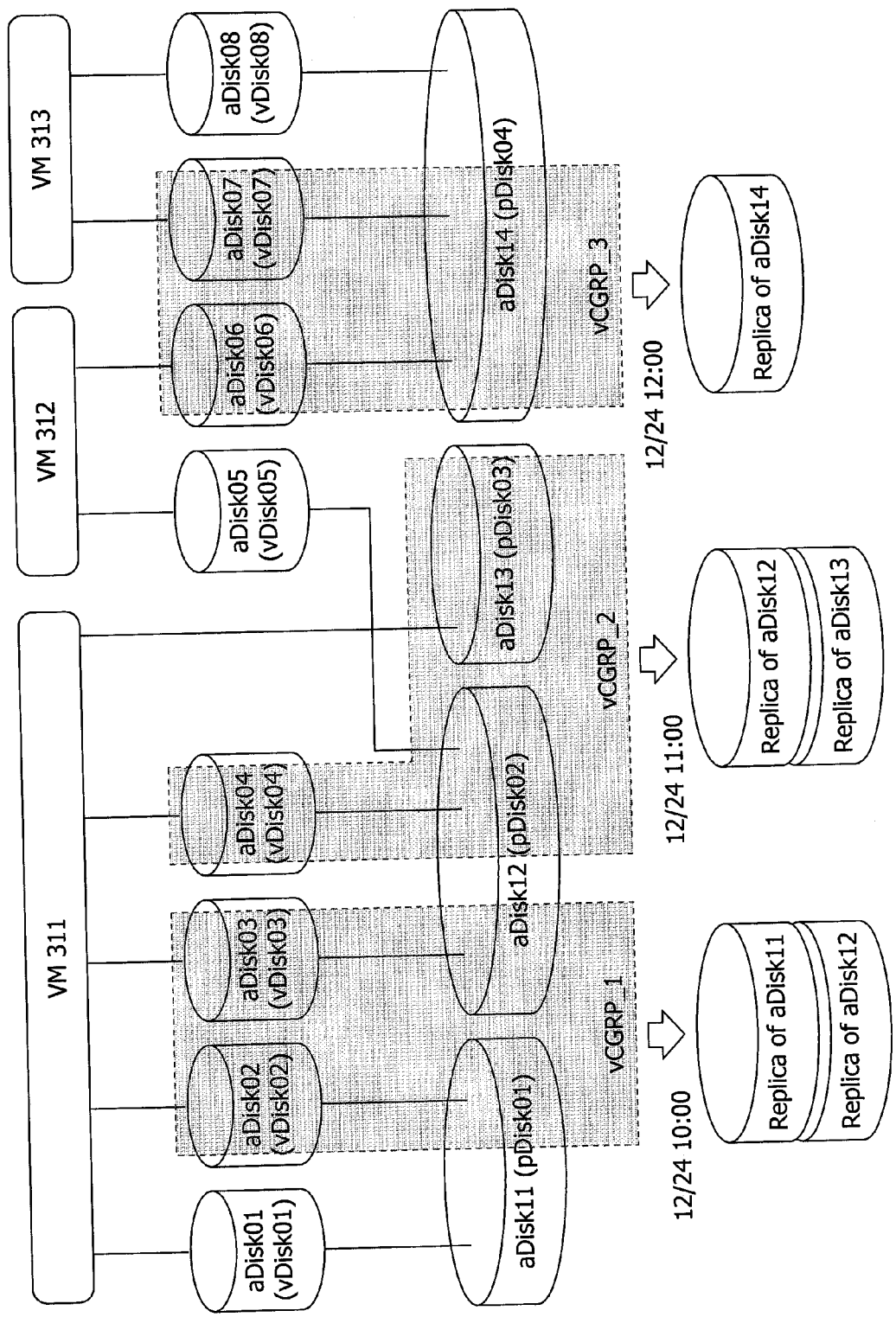
Fig.25 Taking Snapshot (Replica)

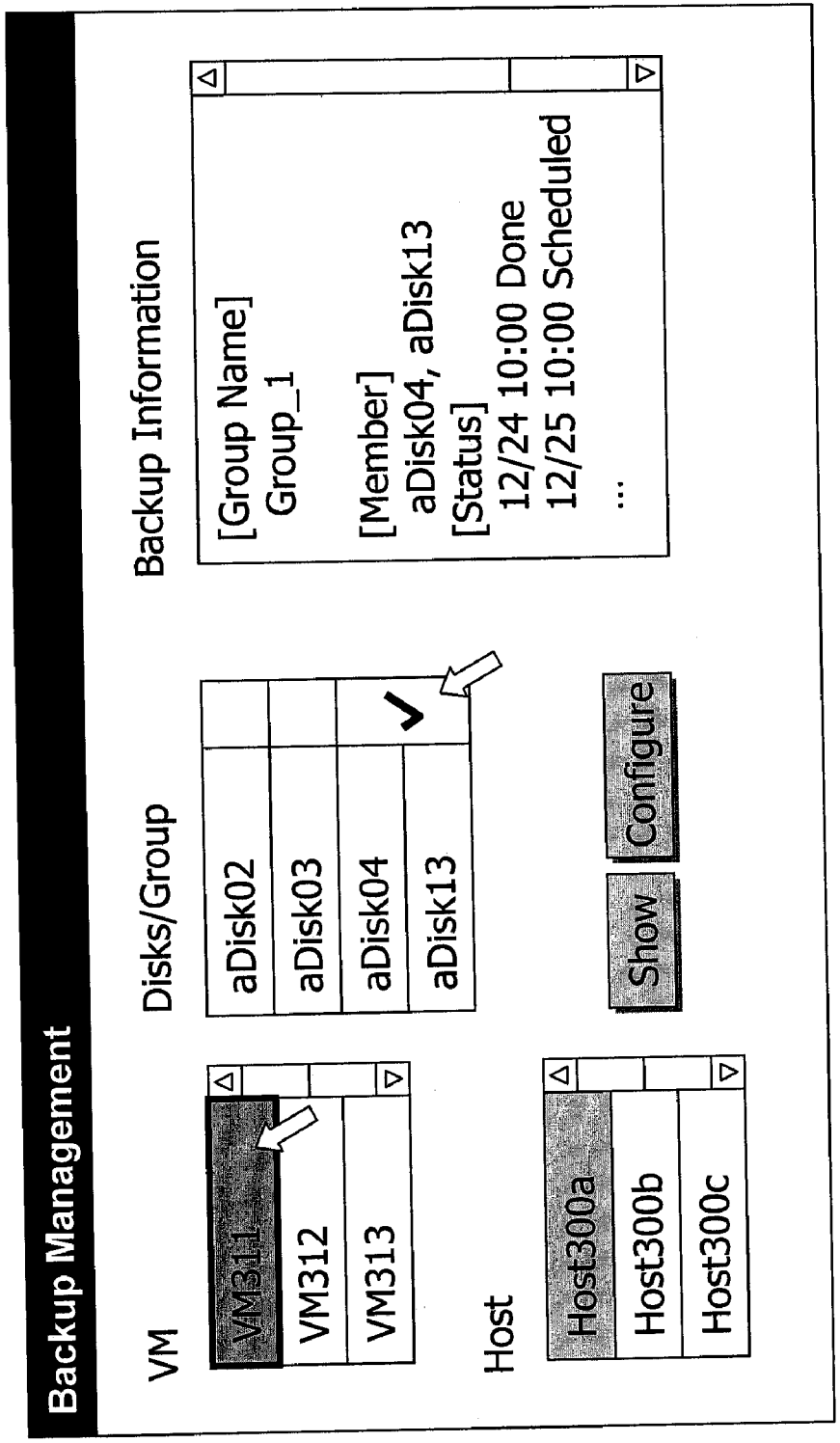
Fig.26 Example of Management View

| vCGRP | Snapshot Schedule | Status |
|---|---|---|
| 1 | 12/24 10:00 | Done |
| | 12/25 10:00 | Scheduled |
| | ... | ... |
| 2 | 12/24 11:00 | Done |
| | 12/25 11:00 | Scheduled |
| | ... | ... |
| 3 | 12/24 12:00 | Done |
| | 12/25 12:00 | Scheduled |
| | ... | ... |

Backup Mgmt Table 507

Fig.27 Example of Backup Mgmt Table

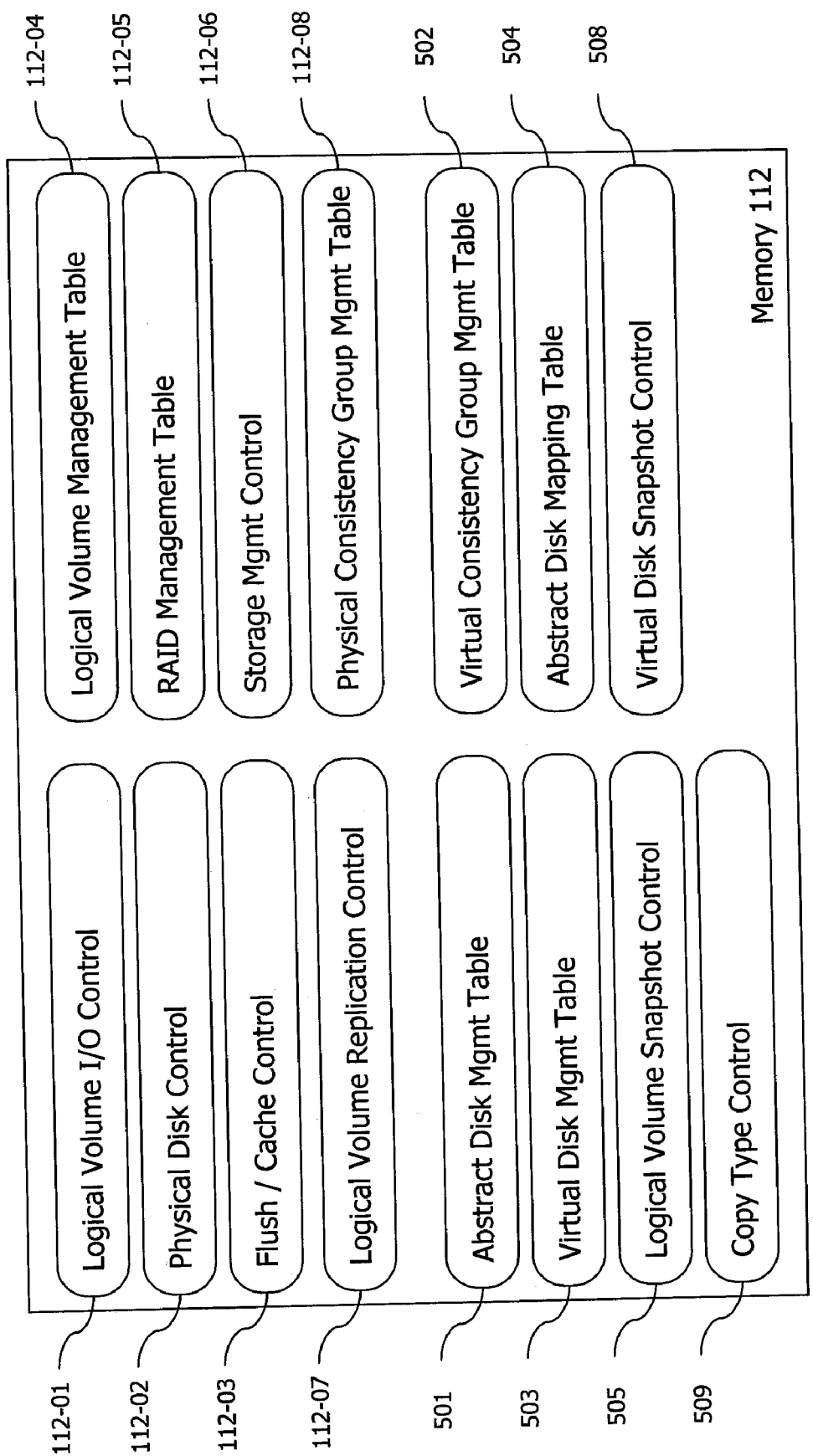
Fig.28 Software Module Configuration on Storage Controller

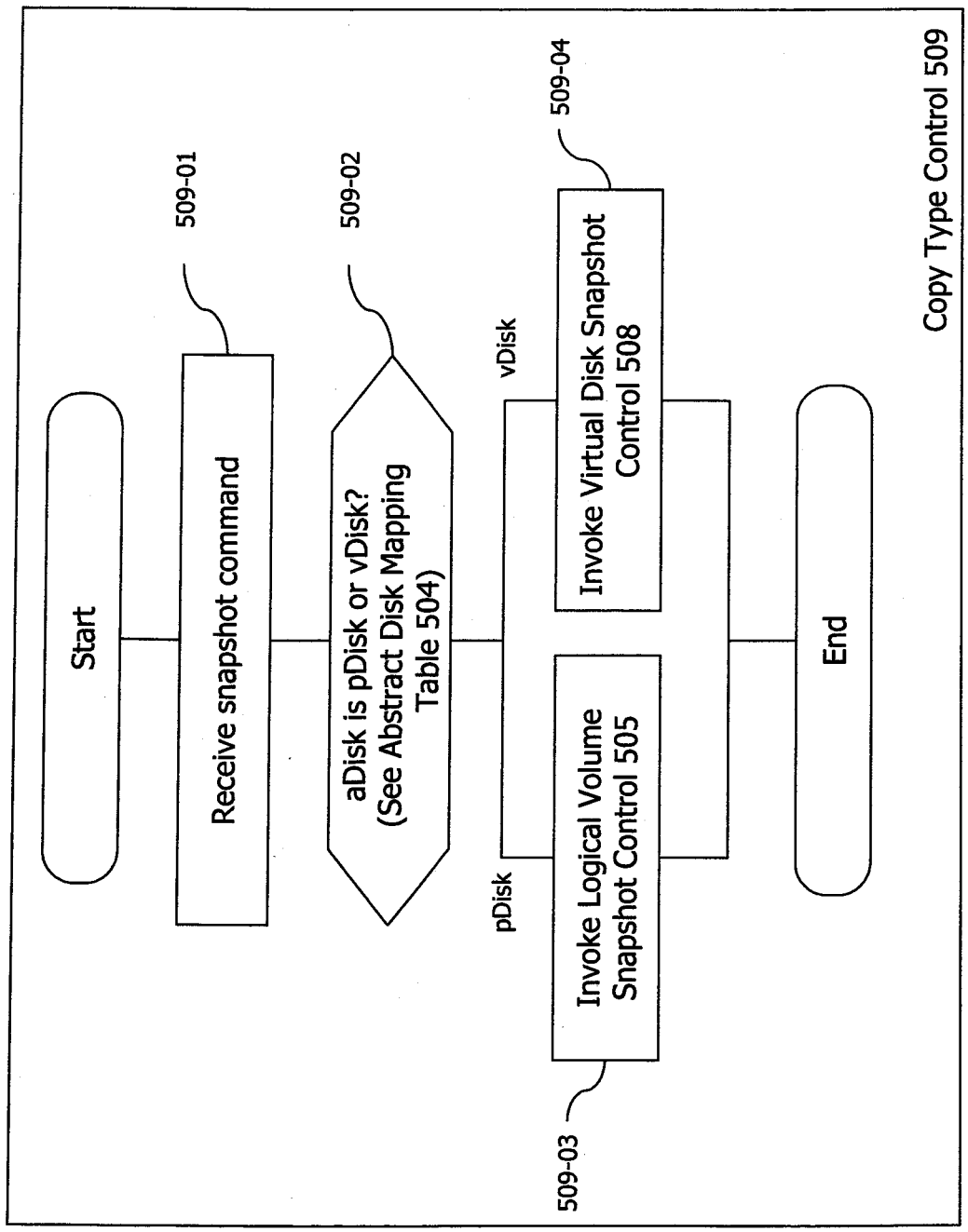
Fig.29 Flowchart of Determining Copy Type

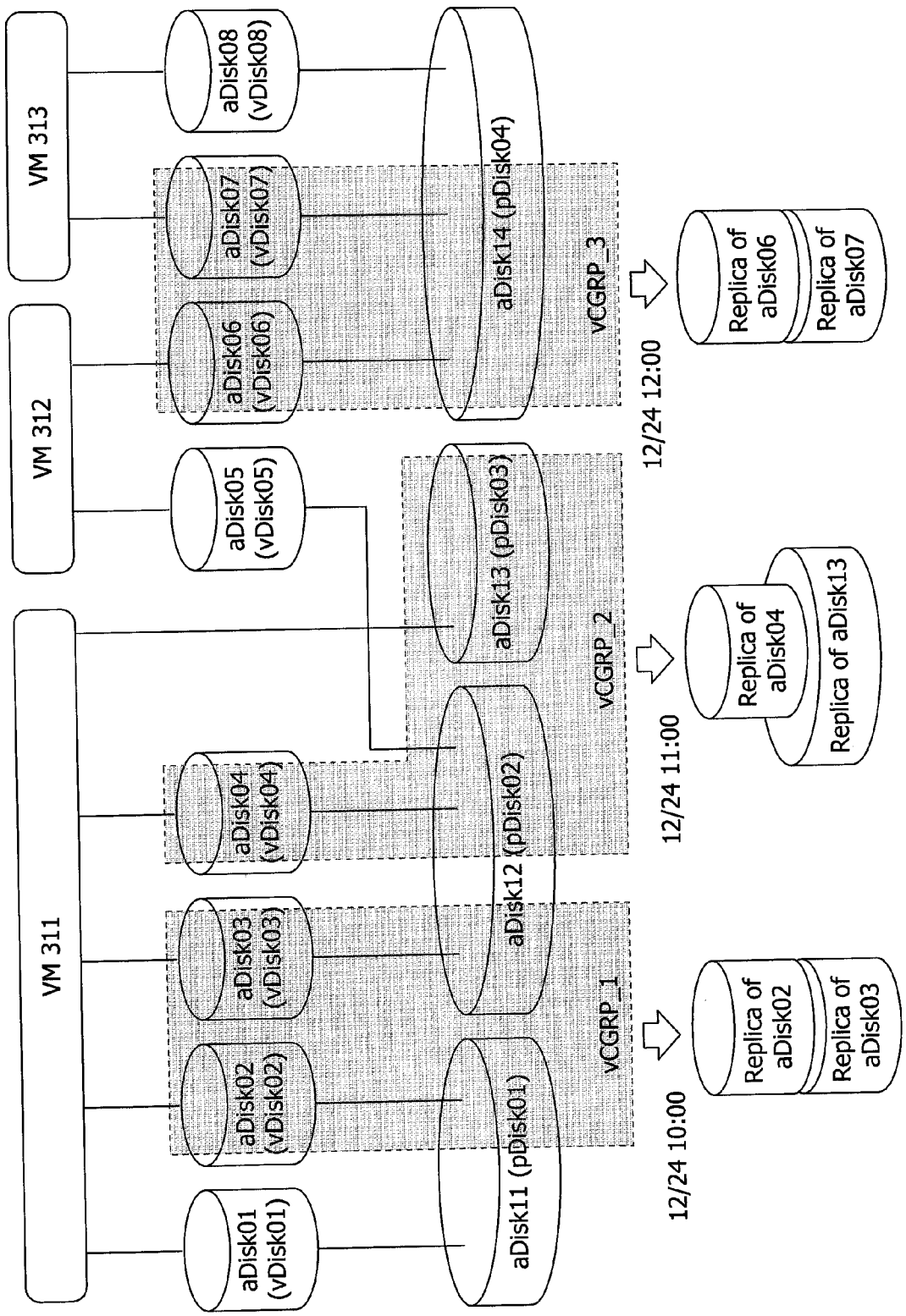
Fig.30 Taking Snapshot (Replica)

METHOD AND APPARATUS FOR LOGICAL VOLUME MANAGEMENT FOR VIRTUAL MACHINE ENVIRONMENT

BACKGROUND OF THE INVENTION

The present invention relates generally to logical volume management of a storage subsystem, especially for a network storage subsystem such as SAN (Storage Area Network) or NAS (Network Attached Storage), in a virtual machine environment.

Virtual Machine (VM) technology allows users to create virtual server machines onto physical server machines. Recently, many VM technologies use network storage subsystems such as SAN or NAS in order to store their data. For instance, using SAN for the VM environment allows each VM to move among physical server machines (e.g., VM-A can move from physical server machine-A to physical server machine-B).

Each VM has a virtual disk image such as a VMDK (Virtual Machine Disk Format) or VHD (Virtual Hard Disk) file. The physical server machine connects to the network storage subsystem which provides a LU (Logical Unit) to the physical server machine. A hyper visor program on the physical server machine creates a file system on the LU and creates a virtual image file such as a VMDK or a VHD file. Each VM can read from or write data into a virtual image file as if it were a physical disk image (a hyper visor program handles these processes; it provides disk I/O service to the VM using the virtual image file). Of course, each VM can connect to the physical disk (LU) on the network storage subsystem using RDM (Raw Device Mapping), iSCSI, or the like.

An administrator needs to manage the virtual/physical disk configuration. For instance, the administrator needs to know which physical disk (LU) is used by a specific VM-A or a specific virtual disk A. In another example, the administrator needs to manage the number of disks which are owned by VM-A, and so on.

VMFS (Virtual Machine File System) and RDM (Raw Device Mapping) allow the administrator to manage the virtual disk and VM. These management processes are performed by the hyper visor program on physical server machine.

These current solutions cover only the management of virtual disk and VM. However, each VM can also connect to a physical disk (LU) by using iSCSI, for instance. In that case, the administrator needs to manage not only the virtual disk but also the physical disk associated with a specific VM. Current solutions cannot address this problem.

There is no existing method to manage the virtual disk and physical disk together. This gives rise to data backup problems, for instance. When the administrator performs backup of the VM data, data consistency between or among multiple disks should be considered. This concept is referred to as "Consistency Group" (CGRP). CGRP allows multiple disks to have backup data simultaneously. For instance, application program-A uses disk-A, application program-B uses disk-B. Disk-A and Disk-B should be backed up because these disks have a relationship and have consistent data between the disks. The lack of a management method for both virtual and physical disks presents difficulties in addressing this kind of backup situation.

BRIEF SUMMARY OF THE INVENTION

Exemplary embodiments of the invention provide a method and an apparatus for logical volume management of a storage subsystem, especially for a network storage subsystem in a VM environment.

In accordance with an aspect of the present invention, a storage system comprises a storage subsystem including a processor, a memory, one or more virtual disks, and one or more logical disks each corresponding to a physical storage area in the storage subsystem; and a host computer connected with the storage subsystem via a network. The host computer includes a plurality of virtual machines running thereon. The virtual machines each are connected to at least one of the virtual disks or logical disks in the storage subsystem. In the storage subsystem, abstract disks each represent one of the virtual disks or logical disks. An abstract disk management table is stored in the memory of the storage subsystem to manage a relationship between the abstract disks and the one or more virtual disks and between the abstract disks and the one or more logical disks.

In some embodiments, for each disk of the virtual disks and the logical disks, the storage subsystem assigns an abstract disk name for the abstract disk that represents said each disk. A virtual consistency group management table is stored in the memory of the storage subsystem to list, for each virtual consistency group, a plurality of the abstract disks among which to keep data consistency in said each virtual consistency group. A virtual disk management table is stored in the memory of the storage subsystem to list a relationship between each of the virtual disks and a corresponding logical disk associated with said each virtual disk. A physical consistency group management table is stored in the memory of the storage subsystem to list, for each physical consistency group, a plurality of logical disks among which to keep data consistency in said each physical consistency group. The storage subsystem receives a selection of a plurality of the abstract disks to be in the same virtual consistency group, updates the virtual consistency group table based on the selection, searches the logical disks that are associated with the selection of abstract disks, and updates the physical consistency group table by grouping the associated logical disks into the same physical consistency group.

In specific embodiments, one of the host computer or the storage subsystem executes snapshot control to suspend data I/O to and from the storage subsystem; in response to a command to take a snapshot of a specified disk in the storage subsystem, to search the abstract disk representing the specified disk using the abstract disk management table; to search the virtual consistency group management table for any other abstract disks belonging to the same virtual consistency group as the abstract disk representing the specified disk; if there are no other abstract disks belonging to the same virtual consistency group, to take a snapshot image of the abstract disk representing the specified disk; and if there are other abstract disks belonging to the same virtual consistency group, to search the abstract disk management table for one or more virtual disks or logical disks that are represented by the other abstract disks belonging to the same virtual consistency group, and to take a snapshot image of the abstract disk representing the specified disk and a snapshot image of each of the other abstract disks belonging to the same virtual consistency group.

In specific embodiments, one of the host computer or the storage subsystem executes snapshot control, when taking the snapshot image of the abstract disk representing the specified disk and the snapshot image of each of the other abstract disks belonging to the same virtual consistency group, to invoke a virtual disk snapshot control to take a snapshot image on a virtual disk basis if the abstract disk represents a virtual disk; and invoke a logical disk snapshot control to take a snapshot image on a logical disk basis if the abstract disk represents a logical disk.

In accordance with another aspect of the invention, a storage system comprises a storage subsystem including a processor, a memory, one or more virtual disks, and one or more logical disks each corresponding to a physical storage area in the storage subsystem; a management computer connected with the storage subsystem, the management computer including a management processor and a management memory; and a host computer connected with the storage subsystem via a network. The host computer includes a plurality of virtual machines running thereon. The virtual machines each are connected to at least one of the virtual disks or logical disks in the storage subsystem. In the storage subsystem, abstract disks each represent one of the virtual disks or logical disks. An abstract disk management table is stored in at least one of the memory of the storage subsystem or the management memory of the management computer to manage a relationship between the abstract disks and the one or more virtual disks and between the abstract disks and the one or more logical disks.

Another aspect of the invention is directed to a method of managing one or more virtual disks in a storage subsystem, and managing one or more logical disks each corresponding to a physical storage area in the storage subsystem. A plurality of virtual machines running on a host computer are each connected to one or more of the virtual disks and the logical disks. The method comprises assigning abstract disk names for a plurality of abstract disks each representing one of the virtual disks and the logical disks; and providing an abstract disk management table to manage a relationship between the abstract disks and the one or more virtual disks and between the abstract disks and the one or more logical disks.

Another aspect of the invention is directed to a computer-readable storage medium storing a plurality of instructions for controlling a data processor to manage one or more virtual disks in a storage subsystem, and manage one or more logical disks each corresponding to a physical storage area in the storage subsystem. A plurality of virtual machines running on a host computer are each connected to one or more of the virtual disks and the logical disks. The plurality of instructions comprise instructions that cause the data processor to assign abstract disk names for a plurality of abstract disks each representing one of the virtual disks and the logical disks; and instructions that cause the data processor to provide an abstract disk management table to manage a relationship between the abstract disks and the one or more virtual disks and between the abstract disks and the one or more logical disks.

This invention defines the concept of abstract disk layer which covers both virtual and physical disks. For instance, abstract disk 01 represents virtual disk 01, abstract disk 02 represents physical disk 01. When the host or the VM uses virtual disk 01 and physical disk 01 (for RDM), the administrator manages abstract disk 01 and 02 in place of managing virtual disk 01 and physical disk 01 as conventional systems do. The administrator can manage both virtual and physical disks together using abstract disks. In addition, the administrator can define a consistency group between virtual and physical disks when executing backup.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration in which the method and apparatus of the invention may be applied.

FIG. 2 shows a software module configuration of the memory in the storage controller of the storage subsystem of FIG. 1 according to a first embodiment of the invention.

FIG. 3 shows an exemplary configuration of the host computer of FIG. 1.

FIG. 4 shows an exemplary configuration of the management server of FIG. 1.

FIG. 5 shows an example of the logical view of a system configuration of the host computer and the storage subsystem of FIG. 1.

FIG. 6 illustrates an example of volume management using abstract disks.

FIG. 7 illustrates an example of an abstract disk management table.

FIG. 8 illustrates an example of an abstract disk mapping table.

FIG. 9 illustrates an example of virtual consistency group management using abstract disks.

FIG. 10 illustrates an example of a virtual consistency group management table.

FIG. 11 illustrates an example of a virtual disk management table.

FIG. 12 illustrates an example of a physical disk group management table.

FIG. 13 illustrates a flow diagram of abstract disk creation associating an abstract disk with a physical disk.

FIG. 14 illustrates a flow diagram of abstract disk creation associating an abstract disk with a virtual disk.

FIG. 15 shows an example of a management view of an abstract disk.

FIG. 16 illustrates a flow diagram of virtual consistency group creation.

FIG. 17 shows an example of a management view for configuring a virtual consistency group.

FIG. 18 shows another example of a management view for configuring a virtual consistency group.

FIG. 19 shows an example of the logical view of a system configuration of the host computer and the storage subsystem for backup.

FIG. 20 shows another example of the logical view of a system configuration of the host computer and the storage subsystem for backup.

FIG. 21 shows another example of the logical view of a system configuration of the host computer and the storage subsystem for backup.

FIG. 22 shows another example of the logical view of a system configuration of the host computer and the storage subsystem for backup.

FIG. 23 shows another example of the logical view of a system configuration of the host computer and the storage subsystem for backup.

FIG. 24 illustrates a flow diagram of taking a snapshot image using a virtual consistency group and an abstract disk.

FIG. 25 shows an example of the logical view of a system configuration after taking snapshot images according to the first embodiment.

FIG. 26 shows an example of a management view for backup management.

FIG. 27 illustrates an example of a backup management table.

FIG. 28 shows a software module configuration of the memory in the storage controller of the storage subsystem of FIG. 1 according to a second embodiment of the invention.

FIG. 29 shows an example of a flow diagram of determining the copy type according to the second embodiment.

FIG. 30 shows an example of the logical view of a system configuration after taking snapshot images according to the second embodiment.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for logical volume management of a storage subsystem, especially for SAN or NAS, in a virtual machine environment.

FIRST EMBODIMENT

1. System Structure

FIG. 1 shows a system configuration of this invention. It comprises a storage subsystem 100, a SAN 200, a host computer 300, and a management server 400, which are connected via a LAN.

The storage subsystem 100 has a storage controller 110 and a disk unit 120. The storage controller 110 performs disk I/O functionality with the host computer 300 using Fibre Channel Protocol via the SAN 200. The disk unit 120 has plural hard disk drives (HDDs 121). The storage controller 110 combines these HDDs 121 and configures RAID (Redundant Arrays of Inexpensive Disks), and then provides one or more storage volumes (LU: Logical Unit) to the host computer 300. These functions are executed by the CPU 111 using application programs stored in the memory 112. The storage controller 110 further includes a SAN interface 113 with the SAN 200, an Ether interface 115 with the LAN, and a disk interface 114 with the disk unit 120.

FIG. 2 shows a software module configuration of the memory 112 in the storage controller of the storage subsystem of FIG. 1. The memory 112 stores a logical volume I/O control 112-01, a physical disk control 112-02, a flush/cache control 112-3, a logical volume management table 112-04, a RAID management table 112-05, a storage management control 112-06, a logical volume replication control 112-07, a physical consistency group management table 112-08, an abstract disk management table 501, a virtual consistency group management table 502, a virtual disk management table 503, an abstract disk mapping table 504, and a snapshot control 505.

FIG. 3 shows the configuration of the host computer 300, which is connected to the SAN 200 via an HBA (Host Bus Adapter) 303. The host computer 300 further includes a CPU 301 and an Ether interface 304 for the LAN. The host computer 300 has a hyper visor program for virtual machine 302-02 which enables the physical host computer 300 to run multiple virtual server machine images (VMs). Each VM has I/O connections to the storage subsystem 100. The memory 302 stores the hyper visor program 302-02, an operating system 302-01, a snapshot control 505, and a backup agent program 506.

FIG. 4 shows the configuration of the management server 400. It includes a CPU 401 and an Ether interface 403 which connects via the LAN to the storage subsystem 100, SAN 200, and host computer 300 to control them. The memory 402 stores an operating system 402-01, a host management control 402-02, a VM management control 402-03, a storage management control 402-04, an abstract disk management table 501, a virtual consistency group management table 502, a virtual disk management table 503, an abstract disk mapping table 504, and a backup management table 507.

2. Volume Management Using Abstract Disk

This invention allows the administrator to manage not only the virtual disk of VM but also the physical disk of the storage subsystem together. In order to do this, the system defines abstract disks. An abstract disk is a broader concept that represents every disk, including a virtual disk (VMFS, VHD) or a physical disk (LU, LDEV), for instance.

FIG. 5 shows an example of the logical view of a system configuration of the host computer 300 and the storage subsystem 100 of FIG. 1. The vDisk01 to vDisk08 represent virtual disks of VM (VMFS, VHD). FIG. 5 shows VM 311, VM 312, and VM 313 on the host system 300. Each vDisk (virtual disk) is connected to a VM (e.g., VM 311) and each VM regards a vDisk as a "physical disk." The pDisk01 to pDisk04 represent physical disks (LU) of the storage subsystem 100. One or more vDisks are stored onto one pDisk.

FIG. 6 illustrates an example of volume management using abstract disks. Each vDisk/pDisk is associated with an abstract disk. For instance, vDisk01 is associated with aDisk01 (Abstract disk 01), pDisk01 is associated with aDisk11. This invention lets the administrator manage disks by using abstract disks.

FIG. 7 illustrates an example of the abstract disk management table 501. It manages the relationship between vDisk/pDisk and aDisk. The abstract disk management table 501 can be managed by the storage subsystem 100 (FIG. 2) or the management server 400 (FIG. 4), for instance.

It is very important for the administrator to know the connection between disks and machines. The administrator needs to know which disks are used by which machines (e.g., VM, hosts). FIG. 8 shows an example of the abstract disk mapping table 504. It manages which machines use which abstract disks. By checking the abstract disk management table 504, the administrator can know which machines use which virtual/physical disks.

3. Virtual Consistency Group

The use of a consistency group (CGRP) allows the administrator to keep data consistency among multiple disks when backup is executed. Conventionally CGRP is based on physical disks. In the present invention, the concept of abstract disk allows the use of CGRP to cover not only physical disks but also virtual disks.

FIG. 9 illustrates an example of virtual consistency group (vCGRP) management using abstract disks. For instance, aDisk02 and aDisk03 (i.e., vDisk02 and vDisk 03) can be in the same vCGRP_1, while aDisk04 and aDisk13 (i.e., vDisk04 and pDisk03) can be in the same vCGRP_2. vCGRP can be defined among virtual and/or physical disks. FIG. 10 illustrates an example of the virtual consistency group management table 502. It manages the virtual consistency group member by correlating vCGRP and aDisk.

FIG. 11 illustrates an example of the virtual disk management table 503. It manages the relationship between virtual disks (such as VMFS) and physical disks. The virtual CGRP management table 502 and the virtual disk management table 503 can be managed by the storage subsystem 100 (FIG. 2) or the management server 400 (FIG. 4), for instance.

FIG. 12 illustrates an example of the physical disk group management table 112-08. The storage subsystem 100 has the physical disk pDisk (LU) copy function which supports physical consistency group pCGRP. By checking the consistency group management table 502, virtual disk management table 503, and physical consistency group management table 112-08, the virtual CGRP and the physical CGRP can be tied up with each other (see FIG. 16).

4. Configuration Step of Abstract Disk, Virtual Consistency Group

FIG. 13 illustrates a flow diagram of abstract disk creation associating an abstract disk aDisk with a physical disk pDisk. The storage management control (112-06 in the storage subsystem 100 or 402-04 in the management server 400) executes this process, for instance. At first, it creates an LU (pDisk) in the conventional way in step 112-01-01. In step 112-01-02, it creates an aDisk name (e.g., "aDisk01") and, in step 112-01-03, it associates the pDisk and the aDisk by updating the abstract disk management table 501. The process may create the aDisk names or assign them to the abstract disks, or it may assign the aDisk names created by a user.

As used herein, the term physical disk (pDisk) is a logical disk corresponding to a physical storage area, including, for example, logical unit (LU), hard disk drive (HDD), and the like.

FIG. 14 illustrates a flow diagram of abstract disk creation associating an abstract disk aDisk with a virtual disk vDisk. The storage management control (112-06 in the storage subsystem 100 or 402-04 in the management server 400) executes this process, for instance. At first, it gets the vDisk configuration from the host 300 in step 112-02-01. A vDisk is created by the host management control 402-02 or VM management control 402-03, generally. The vDisk configuration includes the vDisk name and the pDisk name which stores its vDisk, at least. In step 112-02-02, it creates an aDisk name (e.g., "aDisk01 ") and, in step 112-02-03, associates the vDisk and aDisk by updating the abstract disk management table 501. In step 112-02-04, it updates the virtual disk management table 503 to record the relationship between the vDisk and aDisk as well.

The name of an abstract disk can be the combination of the node name and disk name such as, e.g., VM301 _disk01, Host300_disk100, Storage_Subsystem100_disk10, or the like. It can be generated automatically using the node name, disk name, timestamp, and so on.

Figure 15:
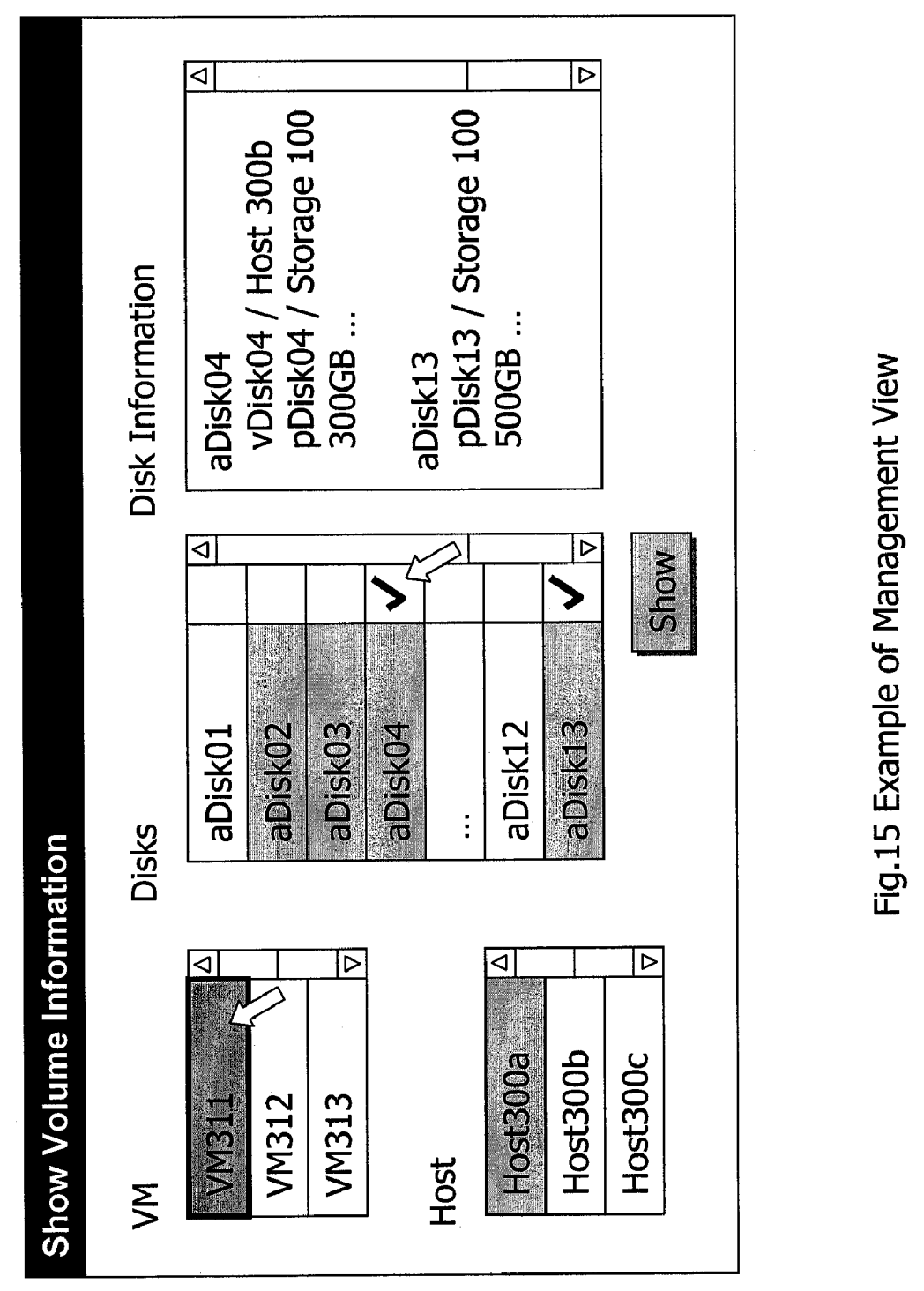

FIG. 15 shows an example of a management view of an abstract disk. It allows the administrator to manage the aDisk by using GUI (graphical user interface). For instance, the administrator can show the detailed disk information by clicking the desired aDisk.

FIG. 16 illustrates a flow diagram of virtual consistency group creation. The storage management control (112-06 in the storage subsystem 100 or 402-04 in the management server 400) executes this process, for instance. At first, the administrator selects multiple aDisks which will belong to the same consistency group in step 112-03-01 (by using the management view shown in FIG. 17 and FIG. 18, for instance). In step 112-03-02, it updates the virtual consistency group management table 502. In step 112-03-03, it searches the pDisks which are associated with selected aDisks in order to update the physical consistency group management table 112-08 in step 112-03-04. Updating the physical consistency group management table 112-08 allows the storage subsystem 100 to know which virtual/physical disks belong to the same consistency group, and to execute physical disk replication with regard to multiple disks consistency.

5. Data Protection using Abstract Disk, Virtual Consistency Group

The use of the consistency group (CGRP) allows the storage subsystem 100 to perform multiple disks backup with data consistency among multiple disks. For instance, the application program uses disk A and disk B. When backing up disk A and disk B, these disks should be backed up simultaneously because of data consistency between disk A and disk B. The conventional method allows the storage subsystem to execute CGRP backup for multiple physical disks (LU).

However, VM adoption requires the administrator to perform CGRP backup for not only physical disks but also virtual disks which are used by the VM. FIG. 9 shows the example of virtual CGRP using aDisk concept. In this case, vDisk02 and vDisk03, vDisk04 and pDisk 03, vDidk06 and vDisk07 need to be backed up, respectively, as the same CGRP, for instance.

FIGS. 19-23 show examples of the logical view of a system configuration of the host computer and the storage subsystem for backup. In order to perform backup, the snapshot control 505 and backup agent program 506 are required. The snapshot control 505 creates snapshot image data of each disk. The backup agent program 506 directs the operation system 311-01 and/or the application program 311-02 to suspend disk I/O, and directs the VM (311-313)/host 300/storage subsystem 100 to create snapshot image (using the snapshot control 505). In FIG. 19, the VM 311-313 each includes an application program 311-02, operation system 311-01, backup agent program 506, and snapshot control 505. In FIG. 20, a single snapshot control 505 is provided in the host 300 instead. In FIG. 21, a single snapshot control 505 is provided in the storage subsystem 100 instead. In FIG. 22, a single backup agent program 506 and a single snapshot control 505 are provided in the host 300 instead. In FIG. 23, a single backup agent program 506 is provided in the host 300 and a single snapshot control 505 is provided in the storage subsystem instead.

FIG. 24 illustrates a flow diagram of taking a snapshot image using a virtual consistency group and an abstract disk. The snapshot control 505 (in the host 300 or storage subsystem 100) can be invoked by the backup agent program 506 in the host 300, for instance. When invoked, it suspends data I/O in step 505-01, and obtains the command to take a snapshot of a specified disk from the backup agent program 506 in the host 300 in step 505-02. In step 505-03, it searches the aDisk name of the specified virtual/physical disk which is the target of backup (the administrator will select the virtual/physical disk). In step 505-04, it searches other aDisks which belong to the same virtual CGRP as the specific virtual/physical disk, using the virtual consistency group management table 502. If there are no other aDisks (if no), it takes a snapshot image of the specific disk in step 505-05. If there are other aDisks (if yes), it searches the associated vDisks/pDisks from the abstract disk management table 501 in step 505-07, and creates multiple snapshot images of multiple aDisks which belong to the same virtual CGRP in step 505-08. Finally, it directs the backup agent program 506 to resume data I/O in step 505-06.

FIG. 25 shows an example of the logical view of a system configuration after taking snapshot images. There are several methods to take an aDisk snapshot image (taking vDisk snapshot, taking pDisk snapshot after taking vDisk snapshot, taking pDisk snapshot, for instance). When taking snapshot images, the abstract disk management table 501, virtual CGRP management table 502, virtual disk management table 503, and physical CGRP management table 112-08 will be used. For example, when taking snapshot images of vDisk and pDisk by specifying the vDisk, it searches the pDisk name from the virtual CGRP management table 502, virtual disk management table 503, and physical CGRP management table 112-08 by using the vDisk name.

FIG. 26 shows an example of a management view for backup management. FIG. 27 illustrates an example of a backup management table. The administrator can manage backup job scheduling by using GUI such as that shown in FIG. 27, for instance. The backup scheduling data is stored in the backup management table 507, for instance. It manages the schedule of taking snapshot image and its status (done, scheduled, and so on).

SECOND EMBODIMENT

The second embodiment provides a system and a method in which the storage subsystem includes two kinds of copy/snapshot function. One is based on logical volume, and the other is based on virtual disk (e.g., VMDK file). A program/module invokes one or both of these functions according to the consistency group configuration. Utilizing these two functions, virtual hard disks (vDisks) and logical volumes (pDisks) are copied with the appropriate functions, thereby eliminating any unintended snapshot data taken only by a logical volume-based snapshot function.

FIG. 28 shows a software module configuration of the memory 112 in the storage controller of the storage subsystem of FIG. 1 according to the second embodiment of the invention. As compared with FIG. 2 of the first embodiment, FIG. 28 shows logical volume/disk snapshot control 505, virtual disk snapshot control 508, and copy type control 509. The logical volume snapshot control 505 takes snapshot images on the logical volume basis. The virtual disk snapshot control 508 takes snapshot images on the virtual hard disk (file) basis by acquiring block addresses that comprise a specific virtual hard disk from the host 300, for instance. This type of snapshot control is available from VMware as vStorage API. The copy type control 509 enables the system to sort a snapshot request into logical volume-based snapshot function and virtual disk-based snapshot function. It may refer to the abstract disk mapping table 504 to determine which function to use.

FIG. 29 shows an example of a flow diagram of determining the copy type according to the second embodiment. In step 509-01, the program receives a snapshot command. The snapshot command may come from step 505-05 or 505-08 of FIG. 24. In step 509-02, the program determines whether the aDisk associated with the snapshot command (the specified disk and other disks in the virtual consistency group) is a pDisk or a vDisk. For a pDisk, the program invokes the logical volume snapshot control 505 in step 509-03. For a vDisk, the program invokes the virtual disk snapshot control 508 in step 509-04.

FIG. 30 shows an example of the logical view of a system configuration after taking snapshot images according to the second embodiment. The snapshot images are directed to aDisks that represent both pDisks and vDisks, as opposed to FIG. 25 in which the snapshot images are directed only to aDisks that represent pDisks. In the second embodiment, the snapshot images are taken more efficiently than in the first embodiment because they do not contain any unintended data due to the additional feature of determining the copy type and invoking the appropriate logical volume snapshot control 505 or virtual disk snapshot control 508. For example, the replica of aDisk02 in FIG. 30 does not include the unintended data contained in the replica of aDisk11 in FIG. 25.

Of course, the system configurations illustrated in FIGS. 1, 3, and 4 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing virtual disks and physical disks of a storage subsystem in a VM environment. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
   a storage subsystem including a processor, a memory, one or more virtual disks, and one or more logical disks each corresponding to a physical storage area in the storage subsystem; and
   a host computer connected with the storage subsystem via a network, the host computer including a plurality of virtual machines running thereon, the virtual machines each being connected to at least one of the virtual disks or logical disks in the storage subsystem,
   wherein, in the storage subsystem, abstract disks each represent one of the virtual disks or logical disks in the storage subsystem;
   wherein an abstract disk management table is stored in the memory of the storage subsystem to manage a relationship between the abstract disks and the one or more virtual disks and between the abstract disks and the one or more logical disks.

2. A storage system according to claim 1,
   wherein for each disk of the virtual disks and the logical disks, the storage subsystem assigns an abstract disk name for the abstract disk that represents said each disk.

3. A storage system according to claim 1,
   wherein a virtual consistency group management table is stored in the memory of the storage subsystem to list, for each virtual consistency group, a plurality of the abstract disks among which to keep data consistency in said each virtual consistency group.

4. A storage system according to claim 3,
   wherein a virtual disk management table is stored in the memory of the storage subsystem to list a relationship between each of the virtual disks and a corresponding logical disk associated with said each virtual disk, and
   wherein a physical consistency group management table is stored in the memory of the storage subsystem to list, for each physical consistency group, a plurality of logical disks among which to keep data consistency in said each physical consistency group.

5. A storage system according to claim 4,
   wherein the storage subsystem receives a selection of a plurality of the abstract disks to be in the same virtual consistency group, updates the virtual consistency group table based on the selection, searches the logical disks that are associated with the selection of abstract disks, and updates the physical consistency group table by grouping the associated logical disks into the same physical consistency group.

6. A storage system according to claim 3, wherein one of the host computer or the storage subsystem executes snapshot control to:
   suspend data I/O to and from the storage subsystem;
   in response to a command to take a snapshot of a specified disk in the storage subsystem, search the abstract disk representing the specified disk using the abstract disk management table;
   search the virtual consistency group management table for any other abstract disks belonging to the same virtual consistency group as the abstract disk representing the specified disk;
   if there are no other abstract disks belonging to the same virtual consistency group, take a snapshot image of the abstract disk representing the specified disk; and
   if there are other abstract disks belonging to the same virtual consistency group, search the abstract disk management table for one or more virtual disks or logical disks that are represented by the other abstract disks belonging to the same virtual consistency group, and take a snapshot image of the abstract disk representing the specified disk and a snapshot image of each of the other abstract disks belonging to the same virtual consistency group.

7. A storage system according to claim 6, wherein one of the host computer or the storage subsystem executes snapshot control, when taking the snapshot image of the abstract disk representing the specified disk and the snapshot image of each of the other abstract disks belonging to the same virtual consistency group, to:
   invoke a virtual disk snapshot control to take a snapshot image on a virtual disk basis if the abstract disk represents a virtual disk; and
   invoke a logical disk snapshot control to take a snapshot image on a logical disk basis if the abstract disk represents a logical disk.

8. A storage system comprising:
   a storage subsystem including a processor, a memory, one or more virtual disks, and one or more logical disks each corresponding to a physical storage area in the storage subsystem;
   a management computer connected with the storage subsystem, the management computer including a management processor and a management memory;
   a host computer connected with the storage subsystem via a network, the host computer including a plurality of virtual machines running thereon, the virtual machines each being connected to at least one of the virtual disks or logical disks in the storage subsystem,
   wherein, in the storage subsystem, abstract disks each represent one of the virtual disks or logical disks in the storage subsystem;
   wherein an abstract disk management table is stored in at least one of the memory of the storage subsystem or the management memory of the management computer to manage a relationship between the abstract disks and the one or more virtual disks and between the abstract disks and the one or more logical disks.

9. A storage system according to claim 8,
   wherein a virtual consistency group management table is stored in at least one of the memory of the storage subsystem or the management memory of the management computer to list, for each virtual consistency group, a plurality of the abstract disks among which to keep data consistency in said each virtual consistency group.

10. A storage system according to claim 9,
    wherein a virtual disk management table is stored in at least one of the memory of the storage subsystem or the management memory of the management computer to list a relationship between each of the virtual disks and a corresponding logical disk associated with said each virtual disk, and
    wherein a physical consistency group management table is stored in the memory of the storage subsystem to list, for each physical consistency group, a plurality of logical disks among which to keep data consistency in said each physical consistency group.

11. A storage system according to claim 10,
    wherein one of the storage subsystem or the management computer receives a selection of a plurality of the abstract disks to be in the same virtual consistency group, updates the virtual consistency group table based on the selection, searches the logical disks that are associated with the selection of abstract disks, and updates the physical consistency group table by grouping the associated logical disks into the same physical consistency group.

12. A storage system according to claim 9, wherein one of the host computer or the storage subsystem executes snapshot control to:
    suspend data I/O to and from the storage subsystem;
    in response to a command to take a snapshot of a specified disk in the storage subsystem, search the abstract disk representing the specified disk using the abstract disk management table;
    search the virtual consistency group management table for any other abstract disks belonging to the same virtual consistency group as the abstract disk representing the specified disk;
    if there are no other abstract disks belonging to the same virtual consistency group, take a snapshot image of the abstract disk representing the specified disk; and
    if there are other abstract disks belonging to the same virtual consistency group, search the abstract disk management table for one or more virtual disks or logical disks that are represented by the other abstract disks belonging to the same virtual consistency group, and take a snapshot image of the abstract disk representing the specified disk and a snapshot image of each of the other abstract disks belonging to the same virtual consistency group.

13. A method of managing one or more virtual disks in a storage subsystem, and managing one or more logical disks each corresponding to a physical storage area in the storage subsystem, wherein a plurality of virtual machines running on a host computer are each connected to one or more of the virtual disks and the logical disks, the method comprising:
    assigning abstract disk names for a plurality of abstract disks each representing one of the virtual disks and the logical disks; and
    providing an abstract disk management table to manage a relationship between the abstract disks and the one or more virtual disks and between the abstract disks and the one or more logical disks.

14. A method according to claim 13, further comprising:
    providing a virtual consistency group management table to list, for each virtual consistency group, a plurality of the abstract disks among which to keep data consistency in said each virtual consistency group.

15. A method according to claim 14, further comprising:
    providing a virtual disk management table to list a relationship between each of the virtual disks and a corresponding logical disk associated with said each virtual disk, and
    providing a physical consistency group management table to list, for each physical consistency group, a plurality of logical disks among which to keep data consistency in said each physical consistency group.

16. A method according to claim 15, further comprising:
    receiving a selection of a plurality of the abstract disks to be in the same virtual consistency group;
    updating the virtual consistency group table based on the selection,
    searching the logical disks that are associated with the selection of abstract disks, and
    updating the physical consistency group table by grouping the associated logical disks into the same physical consistency group.

17. A method according to claim 14, further comprising:
    suspending data I/O to and from the storage subsystem;

in response to a command to take a snapshot of a specified disk in the storage subsystem, searching the abstract disk representing the specified disk using the abstract disk management table;

searching the virtual consistency group management table for any other abstract disks belonging to the same virtual consistency group as the abstract disk representing the specified disk;

if there are no other abstract disks belonging to the same virtual consistency group, taking a snapshot image of the abstract disk representing the specified disk; and if there are other abstract disks belonging to the same virtual consistency group, searching the abstract disk management table for one or more virtual disks or logical disks that are represented by the other abstract disks belonging to the same virtual consistency group, and taking a snapshot image of the abstract disk representing the specified disk and a snapshot image of each of the other abstract disks belonging to the same virtual consistency group.

18. A method according to claim 17, wherein taking the snapshot image of the abstract disk representing the specified disk and the snapshot image of each of the other abstract disks belonging to the same virtual consistency group comprises:

invoking a virtual disk snapshot control to take a snapshot image on a virtual disk basis if the abstract disk represents a virtual disk; and invoking a logical disk snapshot control to take a snapshot image on a logical disk basis if the abstract disk represents a logical disk.

19. A non-transient computer-readable storage medium storing a plurality of instructions for controlling a data processor to manage one or more virtual disks in a storage subsystem, and manage one or more logical disks each corresponding to a physical storage area in the storage subsystem, wherein a plurality of virtual machines running on a host computer are each connected to one or more of the virtual disks and the logical disks, the plurality of instructions comprising:

instructions that cause the data processor to assign abstract disk names for a plurality of abstract disks each representing one of the virtual disks and the logical disks; and instructions that cause the data processor to provide an abstract disk management table to manage a relationship between the abstract disks and the one or more virtual disks and between the abstract disks and the one or more logical disks.

20. A non-transient computer-readable storage medium according to claim 19, wherein the plurality of instructions further comprise:

instructions that cause the data processor to provide a virtual consistency group management table to list, for each virtual consistency group, a plurality of the abstract disks among which to keep data consistency in said each virtual consistency group.

* * * * *